United States Patent
Chen et al.

(10) Patent No.: US 8,483,306 B2
(45) Date of Patent: Jul. 9, 2013

(54) METHOD AND SYSTEM FOR PRECODING AND METHOD FOR CONSTRUCTING PRECODING CODEBOOK

(75) Inventors: Yijian Chen, Shenzhen (CN); Guanghui Yu, Shenzhen (CN); Bo Dai, Shenzhen (CN); Xun Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 21 days.

(21) Appl. No.: 13/259,667

(22) PCT Filed: Jun. 30, 2010

(86) PCT No.: PCT/CN2010/074847
§ 371 (c)(1),
(2), (4) Date: Jan. 19, 2012

(87) PCT Pub. No.: WO2011/017991
PCT Pub. Date: Feb. 17, 2011

(65) Prior Publication Data
US 2012/0134434 A1    May 31, 2012

(30) Foreign Application Priority Data
Aug. 10, 2009  (CN) .......................... 2009 1 0163676

(51) Int. Cl.
*H04B 7/02* (2006.01)
*H04L 1/02* (2006.01)

(52) U.S. Cl.
USPC ....................................................... 375/267

(58) Field of Classification Search
USPC ........................................ 375/267, 259, 240
See application file for complete search history.

(56) References Cited

U.S. PATENT DOCUMENTS

| | | | |
|---|---|---|---|
| 7,720,168 B2 * | 5/2010 | Su et al. | 375/267 |
| 8,254,487 B2 * | 8/2012 | Tsai et al. | 375/267 |
| 2008/0108310 A1 * | 5/2008 | Tong et al. | 455/69 |

(Continued)

FOREIGN PATENT DOCUMENTS

| | | |
|---|---|---|
| CN | 101262310 A | 9/2008 |
| CN | 101631004 A | 1/2010 |
| WO | WO 2008/097035 A1 | 8/2008 |

OTHER PUBLICATIONS

International Search Report from corresponding PCT application PCT/CN2010/074847, dated Oct. 21, 2010 (with English translation).

*Primary Examiner* — Daniel Washburn
*Assistant Examiner* — Berhanu Tadese
(74) *Attorney, Agent, or Firm* — IPLM Group, P.A.

(57) ABSTRACT

A pre-coding method and system and a method for constructing pre-coding codebook are disclosed, including: a transmitting end and a receiving end storing information of a pre-coding codebook together, the receiving end selecting a codeword from the pre-coding codebook according to an estimated channel matrix and feeding back a serial number of the codeword to the transmitting end, and the transmitting end finding out the codeword according to the serial number and pre-coding, by using the codeword, a symbol block sent to the receiving end; wherein, at least eight codeword vectors or column vectors in at least eight codeword matrixes in the pre-coding codebook are obtained based on 8-dimensional vectors selected from a 8-dimensional vector set, and this 8-dimensional vector set is obtained by calculating from the part or all of 4-dimensional vectors in $u_1$, $u_2$, $u_3$, $u_4$, $u_5$, $u_6$, $u_7$, $u_8$, s, m, n.

19 Claims, 3 Drawing Sheets

U.S. PATENT DOCUMENTS

| | | | |
|---|---|---|---|
| 2008/0303699 A1* | 12/2008 | Zhang et al. | 341/67 |
| 2009/0006518 A1* | 1/2009 | Rensburg et al. | 708/520 |
| 2010/0034308 A1* | 2/2010 | Kim et al. | 375/267 |
| 2010/0215112 A1* | 8/2010 | Tsai et al. | 375/267 |
| 2011/0176581 A1* | 7/2011 | Thomas et al. | 375/146 |
| 2012/0051257 A1* | 3/2012 | Kim et al. | 370/252 |
| 2012/0069926 A1* | 3/2012 | Park et al. | 375/267 |
| 2012/0087422 A1* | 4/2012 | Zhou et al. | 375/259 |

\* cited by examiner

METHOD AND SYSTEM FOR PRECODING AND METHOD FOR CONSTRUCTING PRECODING CODEBOOK

TECHNICAL FIELD

The present invention relates to a pre-coding method and a system and a method for constructing a pre-coding codebook in a Multiple-Input Multiple-Output (MIMO) system in the communication field, and more particularly, to a pre-coding method and a system and a method for constructing a pre-coding codebook when a channel matrix is low rank in a MIMO system with eight antennas.

BACKGROUND OF THE RELATED ART

In the wireless communication, if both a transmitting end and a receiving end use a plurality of antennas, the spatial multiplexing mode can be adopted to acquire higher rate, thus to improve the transmission rate. At the receiving end the channel matrix passed through by the transmitted signal can be obtained by channel estimation, therefore, although each antenna transmits different data, after passing through the MIMO signal matrix, the transmitted data on each antenna can still be decoded at the receiving end.

Compared with the method for directly decoding the transmitted data on each antenna by using the channel matrix, an enhanced method is to use a transmission pre-coding technology. The concept of layer is defined at the transmitting end, on the same time-frequency resource, different data symbols might be transmitted in each layer, and the number of layers is equal to the rank of the channel matrix. The data in each layer are pre-coded and mapped to the antenna, and then transmitted to the receiving end through the air channel. If the transmitting end is able to know the complete and accurate Channel State Information (CSI), we can carry out the Singular Value Decomposition (SVD) on the specific channel matrix. And then the matrix consisting of the right eigenvectors decomposed from the channel matrix is taken as the pre-coding matrix to pre-code the data in each layer.

However, usually only the receiving end can directly and accurately get the CSI, and the transmitting end acquires the CSI only by feeding back the CSI information to the transmitting end via the receiving end. In the current mainstream standards, the feedback capacity provided by the system for the CSI information is relatively limited, because the feedback amount for feeding back the entire channel information is very huge. Therefore, the mainstream feedback methods are all based on the codebook mode, and the feedback content is the quantitative information of the matrix consisting of the right eigenvectors of the channel, and the quantitative information is represented by the codewords in the codebook.

The basic principle of the pre-coding based on codebook feedback is that, assuming the limited feedback channel capacity is B bps/Hz, the number of available codewords is $N=2^B$. All of the pre-coding matrixes are quantitated to construct the codebook $\Re = \{F_1, F_2 \ldots F_N\}$. The transmitting end and the receiving end store the codebook together. For the channel matrix H obtained by each channel estimation, the receiving end selects a codeword $\hat{F}$ (which can be called as the optimal codeword) from $\Re$ according to the preset criteria, and feeds back the serial number i corresponding to the codeword $\hat{F}$ to the transmitting end. The transmitting end finds out the pre-coded codeword $\hat{F}$ according to the serial number i and pre-codes the transmitted symbol block.

In general, $\Re$ can be further divided into codebooks corresponding to a plurality of Ranks, and each Rank corresponds to a plurality of values to quantitate a pre-coding matrix consisting of the channel right eigenvectors under this Rank. Since the number of the Ranks of channel and the number of the non-zero right eigenvectors are equal, generally when the Rank is N, there are N columns of codewords. Therefore, the codebook $\Re$ can be divided into a plurality of sub-codebooks according to the Rank, shown as table 1:

TABLE 1

| $\Re$ | | |
|---|---|---|
| The number of layers $\upsilon$(Rank) | | |
| 1 | 2 | ... N |
| $\Re_1$ | $\Re_2$ | ... $\Re_N$ |
| the codeword vector set whose column number is 1 | the codeword vector set whose column number is 2 | the codeword vector set whose column number is 3 |

Because of the limitation of the feedback overhead, only the feedback based on the codebook can be used to transmit the pre-coding.

Wherein, when the Rank>1, all of the codewords that need to be stored are in the form of matrix, wherein, the codebook in the LTE protocol uses this feedback method of the codebook quantitation, the downlink 4 transmission antennas codebook in the LTE is shown as table 2 in the following, and in fact the pre-coding codebook and the channel information quantitation codebook in the LTE have the same meaning. In the following, for the sake of consistency, a vector can also be considered as a one-dimensional matrix.

TABLE 2

| | | The total number of layers $\upsilon$ | | | |
|---|---|---|---|---|---|
| Codebook index $u_n$ | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |

TABLE 2-continued

| Codebook index | $u_n$ | The total number of layers $\upsilon$ | | | |
| --- | --- | --- | --- | --- | --- |
| | | 1 | 2 | 3 | 4 |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Wherein,
$W_n = I - 2u_n u_n^H / u_n^H u_n$, I is a unit matrix, and $W_k^{(j)}$ denotes the $j^{th}$ column vector of the matrix $W_k$.
$W_k^{(j1,j2,\ldots,jn)}$ denotes the matrix consisting of the $j_1, j_2, \ldots j_n$ columns of the matrix $W_k$.

With the development of the communication technology, there is a higher demand for the spectrum efficiency in LTE-Advanced, therefore the number of antennas is increased to 8, and we need to design the codebook feedback of 8 transmission antennas to carry out the quantitation feedback of the channel information.

In the LTE standard, the smallest feedback unit of the channel information is subband, one subband consists of several Resource Blocks (RBs), each RB consists of a plurality of Resource Elements (REs), the RE is the smallest unit of time-frequency resource in the LTE, and in the LTE-A, the resource representation method in the LTE continues to use.

In the practical system, the low-rank codebook is most often used, therefore the codebook design of Rank=1 and Rank=2 is very important in the codebook design. In the 4 antennas (Tx) codebook, there is a relatively mature codebook construction method, while in the 8 antennas, due to the increase of the antenna dimension, the mainstream application scenario at the transmitting end changes from the single-polarized antenna to the dual-polarized antenna, therefore, a new 8 antennas codebook needs to be designed.

In the 8 antennas codebook of Rank=1 and Rank=2, two parts of codewords are usually included, one part considers for matching the relevant channel characteristics and the other part considers for matching the irrelevant channel characteristics, and the codeword considering for matching the relevant channel characteristic is the most important consideration. Considering the channel model and the polarization of the antenna, etc., the codeword can have minimum quantitation error for the channel information. Meanwhile, the other codewords only need to be distributed as evenly as possible, even the other codewords can be separated from the codewords that match the relevant channel. We can make the distribution of the codewords even by using a minimal chord distance maximal rule between the codewords.

For example, the first 8 DFT codewords of 16 codewords of the Rank1 in the LTE are designed for the relevant channel, and are very suitable for the relevant channel of the single-polarized antenna, while the last 8 codewords are added based on the first 8 codewords, which guarantees that the 16 codewords can be better distributed in the 4-dimensional multiplex space after increasing to the 16 codewords.

Of course, since the codeword for matching the relevant channel can also be used to match the irrelevant channel, regardless of the optimal performance under the irrelevant channel, the codebook only comprises the codewords for matching the relevant channel. For example, in the process of the LTE discussion, there is a technical scheme in which all of the 16 Rank1 codewords use the DFT codewords suitable for the relevant channel of the single-polarized antenna as the codebook.

Generally in the codebook of Rank=1 or Rank=2 there are K codewords for matching (suitable for) the relevant channel. The other codewords match the irrelevant channel, and this part of codewords might be 0.

So far in the existing codebook technology, when the number of the codewords in Rank=1 or Rank=2 is 16, the number of the codewords for matching the relevant channel is 8 at Rank=1 and Rank=2.

Specify the following values in Table 3:

TABLE 3

| u # | | v # | |
| --- | --- | --- | --- |
| u0 | $[1\ 1\ -1\ -1\ 1\ 1\ -1\ -1]^T$ | v0 | $[1\ 1\ 1\ 1]^T$ |
| u1 | $[1\ q3\ -j\ q2\ 1\ q1\ j\ q0]^T$ | v1 | $[1\ -j\ -1\ -j]^T$ |
| u2 | $[1\ -j\ -1\ j\ -1\ -j\ -1]^T$ | v2 | $[1\ -1\ 1\ -1]^T$ |
| u3 | $[1\ q2\ j\ q3\ 1\ q0\ -j\ q1]^T$ | v3 | $[1\ -j\ -1\ j]^T$ |
| u4 | $[1\ -1\ 1\ 1\ 1\ -1\ 1\ -1]^T$ | v4 | $[1\ q0\ j\ q1]^T$ |
| u5 | $[1\ q1\ -j\ q0\ 1\ q3\ j\ q2]^T$ | v5 | $[1\ q1\ -j\ q0]^T$ |
| u6 | $[1\ j\ -1\ -j\ 1\ j\ 1\ -j]^T$ | v6 | $[1\ q2\ j\ q3]^T$ |
| u7 | $[1\ q0\ j\ q1\ 1\ q2\ -j\ q3]^T$ | v7 | $[1\ q3\ -j\ q2]^T$ |

Wherein,
$q0 = (1 + j)/\sqrt{2}$;
$q1 = (-1 + j)/\sqrt{2}$;
$q2 = (-1 - j)/\sqrt{2}$;
$q3 = (1 - j)/\sqrt{2}$.

In the codebook of Rank=1 and Rank=2, the codewords for matching the relevant channel are shown as Table 4:

TABLE 4

| Index | Rank1 codebook | Rank2 codebook 1 | Rank2 codebook 2 |
| --- | --- | --- | --- |
| 0 | u0 | [u0,u1] | kron(I,v0)*U |
| 1 | u1 | [u1,u2] | kron(I,v1)*U |
| 2 | u2 | [u2,u3] | kron(I,v2)*U |
| 3 | u3 | [u3,u4] | kron(I,v3)*U |
| 4 | u4 | [u4,u5] | kron(I,v4)*U |
| 5 | u5 | [u5,u6] | kron(I,v5)*U |
| 6 | u6 | [u6,u7] | kron(I,v6)*U |
| 7 | u7 | [u7,u0] | kron(I,v7)*U |
| 8-15 | the codewords for matching the irrelevant channel | | |

Wherein, $I = \begin{bmatrix} 1 & 0 \\ 0 & 1 \end{bmatrix}$; $U = \begin{bmatrix} 1 & 1 \\ 1 & -1 \end{bmatrix}/\sqrt{2}$;

However, after pre-coding the codebook of Rank=1 in the related art, with the single-polarized and dual-polarized antenna, the evenly distributed wave beam in the cell direction (120 degrees or 180 degrees) is not formed at the relevant channel, and channel direction information of each UE in the cell is not well quantitated. Furthermore, the formed wave beam has relatively large side lobe, and the power of the main lobe is not concentrated, which results in the performance loss. Wherein, the wave beam pattern obtained in the case of the single-polarized antenna is shown as FIG. 1 (the number of codewords for matching the relevant channel is 8). While in the case of the dual-polarized antenna and the relevant channel, by a simulation experiment, the average quantitation matching degree is less than 0.5.

When Rank=2, taking the implementation complexity and storage problem at the UE end into account, the system can only select one codebook to use, but the codebook 1 has a relatively better performance in the case of the single-polarized antenna, while has a poor performance in the case of the dual-polarized antenna; whereas, the codebook 2 of Rank=2 has a good performance in the case of the dual-polarized antenna, and has a poor performance in the case of the single-polarized antenna.

CONTENT OF THE INVENTION

The technical problem solved by the present invention is to provide a pre-coding method and a system to be applied to the pre-coding when a channel matrix has a low rank in a MIMO system with 8 antennas, so as to improve the pre-coding performance.

In order to solve the aforementioned problem, the present invention provides a pre-coding method, applied to a Multiple-Input Multiple-Output (MIMO) system with eight antennas, and comprising:

a transmitting end and a receiving end storing information of a pre-coding codebook together, the receiving end selecting a codeword from the pre-coding codebook according to an estimated channel matrix and feeding back a serial number of the codeword to the transmitting end, and the transmitting end finding out the codeword according to the serial number and pre-coding, by using the codeword, a symbol block sent to the receiving end; wherein, at least eight codeword vectors or column vectors in at least eight codeword matrixes in the pre-coding codebook are obtained based on 8-dimensional vectors selected from the following 8-dimensional vector set:

$$[u_1 \; s(n) * u_1]^T, [u_1 \; -s(n) * u_1]^T, [u_2 \; s(n) * u_2]^T, [u_2 \; -s(n) * u_2]^T$$
$$[u_3 \; s(n) * u_3]^T, [u_3 \; -s(n) * u_3]^T, [u_4 \; s(n) * u_4]^T, [u_4 \; -s(n) * u_4]^T$$
$$[u_5 \; s(n) * u_5]^T, [u_5 \; -s(n) * u_5]^T, [u_6 \; s(n) * u_6]^T, [u_6 \; -s(n) * u_6]^T$$
$$[u_7 \; s(n) * u_7]^T, [u_7 \; -s(n) * u_7]^T, [u_8 \; s(n) * u_8]^T, [u_8 \; -s(n) * u_8]^T$$

wherein,
$u_1 = [1\;1\;1\;1]^T$, $u_2 = [1\;j\;-1\;-j]^T$, $u_3 = [1\;-1\;1\;-1]^T$, $u_4 = [1\;-j\;-1\;j]^T$
$u_5 = [1\;q0\;j\;q1]^T$, $u_6 = [1\;q1\;-j\;-q0]^T$, $u_7 = [1\;q2\;j\;q3]^T$, $u_8 = [1\;q3\;-j\;q2]^T$
$q0 = (1+j)/\sqrt{2}$; $q1 = (-1+j)/\sqrt{2}$; $q2 = (-1-j)/\sqrt{2}$; $q3 = (1-j)/\sqrt{2}$;
$s(n)$ is an element in vector $s$, $n=1, 2, 3, 4$, and $s=[s(1)\;s(2)\;s(3)\;s(4)]=[1\;j\;q0\;q1]$.

The rank of the channel matrix is equal to 1, and the codeword of the pre-coding codebook is the 8-dimensional codeword vector, wherein at least part of the codeword vectors are obtained based on the 8-dimensional vectors selected from the 8-dimensional vector set; or the rank of the channel matrix is equal to 2, the codeword of the pre-coding codebook is two-column codeword matrix, and in the pre-coding codebook, the first column 8-dimensional vectors of at least part of the codeword matrixes are obtained based on the 8-dimensional vectors selected from the 8-dimensional vector set; and the second column 8-dimensional vectors of at least part of the codeword matrixes are obtained based on the 8-dimensional vectors selected from a set consisting of $[mu_i \; nu_i]^T$, where $i=1\sim8$, $m,n \in \{1, -1, j, -j, q1, q2, q3, q0\}$; and the first column and the second column of each codeword matrix are orthogonal.

The 8-dimensional vectors selected from the 8-dimensional vector set are the following eight 8-dimensional vectors:

$$[u_1 \; s(n) * u_1]^T, [u_1 \; -s(n) * u_1]^T, [u_2 \; s(n) * u_2]^T, [u_2 \; -s(n) * u_2]^T$$
$$[u_3 \; s(n) * u_3]^T, [u_3 \; -s(n) * u_3]^T, [u_4 \; s(n) * u_4]^T, [u_4 \; -s(n) * u_4]^T$$
or
$$[u_5 \; s(n) * u_5]^T, [u_5 \; -s(n) * u_5]^T, [u_6 \; s(n) * u_6]^T, [u_6 \; -s(n) * u_6]^T$$
$$[u_7 \; s(n) * u_7]^T, [u_7 \; -s(n) * u_7]^T, [u_8 \; s(n) * u_8]^T, [u_8 \; -s(n) * u_8]^T$$

wherein, in the eight 8-dimensional vectors, the value of n is same in the 8-dimensional vectors with the same $u_i$, and the value of n is same or different in the 8-dimensional vectors with the different $u_i$.

The 8-dimensional vectors selected from the 8-dimensional vector set are the following sixteen 8-dimensional vectors:

| | | | |
|---|---|---|---|
| $[u_1 \; s(1)*u_1]^T$ | $[u_1 - s(1)*u_1]^T$ | $[u_1 \; s(2)*u_1]^T$ | $[u_1 - s(2)*u_1]^T$ |
| $[u_2 \; s(1)*u_2]^T$ | $[u_2 - s(1)*u_2]^T$ | $[u_2 \; s(2)*u_2]^T$ | $[u_2 - s(2)*u_2]^T$ |
| $[u_3 \; s(1)*u_3]^T$ | $[u_3 - s(1)*u_3]^T$ | $[u_3 \; s(2)*u_3]^T$ | $[u_3 - s(2)*u_3]^T$ |
| $[u_4 \; s(1)*u_4]^T$ | $[u_4 - s(1)*u_4]^T$ | $[u_4 \; s(2)*u_4]^T$ | $[u_4 - s(2)*u_4]^T$ |
| or | | | |
| $[u_1 \; s(3)*u_1]^T$ | $[u_1 - s(3)*u_1]^T$ | $[u_1 \; s(4)*u_1]^T$ | $[u1 - s(4)*u_1]^T$ |
| $[u_2 \; s(3)*u_2]^T$ | $[u_2 - s(3)*u_2]^T$ | $[u_2 \; s(4)*u_2]^T$ | $[u2 - s(4)*u_2]^T$ |
| $[u_3 \; s(3)*u_3]^T$ | $[u_3 - s(3)*u_3]^T$ | $[u_3 \; s(4)*u_3]^T$ | $[u3 - s(4)*u_3]^T$ |
| $[u_4 \; s(3)*u_4]^T$ | $[u_4 - s(3)*u_4]^T$ | $[u_4 \; s(4)*u_4]^T$ | $[u4 - s(4)*u_4]^T$ |
| or | | | |
| $[u_5 \; s(1)*u_5]^T$ | $[u_5 - s(1)*u_5]^T$ | $[u_5 \; s(2)*u_5]^T$ | $[u_5 - s(2)*u_5]^T$ |
| $[u_6 \; s(1)*u_6]^T$ | $[u_6 - s(1)*u_6]^T$ | $[u_6 \; s(2)*u_6]^T$ | $[u_6 - s(2)*u_6]^T$ |
| $[u_7 \; s(1)*u_7]^T$ | $[u_7 - s(1)*u_7]^T$ | $[u_7 \; s(2)*u_7]^T$ | $[u_7 - s(2)*u_7]^T$ |
| $[u_8 \; s(1)*u_8]^T$ | $[u_8 - s(1)*u_8]^T$ | $[u_8 \; s(2)*u_8]^T$ | $[u_8 - s(2)*u_8]^T$ |
| or | | | |
| $[u_5 \; s(3)*u_5]^T$ | $[u_5 - s(3)*u_5]^T$ | $[u_5 \; s(4)*u_5]^T$ | $[u_5 - s(4)*u_5]^T$ |
| $[u_6 \; s(3)*u_6]^T$ | $[u_6 - s(3)*u_6]^T$ | $[u_6 \; s(4)*u_6]^T$ | $[u_6 - s(4)*u_6]^T$ |
| $[u_7 \; s(3)*u_7]^T$ | $[u_7 - s(3)*u_7]^T$ | $[u_7 \; s(4)*u_7]^T$ | $[u_7 - s(4)*u_7]^T$ |
| $[u_8 \; s(3)*u_8]^T$ | $[u_8 - s(3)*u_8]^T$ | $[u_8 \; s(4)*u_8]^T$ | $[u_8 - s(4)*u_8]^T$ |
| or | | | |
| $[u_1 \; s(1)*u_1]^T$ | $[u_1 - s(1)*u_1]^T$ | $[u_5 \; s(1)*u_5]^T$ | $[u_5 - s(1)*u_5]^T$ |
| $[u_2 \; s(1)*u_2]^T$ | $[u_2 - s(1)*u_2]^T$ | $[u_6 \; s(1)*u_6]^T$ | $[u_6 - s(1)*u_6]^T$ |
| $[u_3 \; s(1)*u_3]^T$ | $[u_3 - s(1)*u_3]^T$ | $[u_7 \; s(1)*u_7]^T$ | $[u_7 - s(1)*u_7]^T$ |
| $[u_4 \; s(1)*u_4]^T$ | $[u_4 - s(1)*u_4]^T$ | $[u_8 \; s(1)*u_8]^T$ | $[u_8 - s(1)*u_8]^T$ |
| or | | | |
| $[u_1 \; s(2)*u_1]^T$ | $[u_1 - s(2)*u_1]^T$ | $[u_5 \; s(2)*u_5]^T$ | $[u_5 - s(2)*u_5]^T$ |
| $[u_2 \; s(2)*u_2]^T$ | $[u_2 - s(2)*u_2]^T$ | $[u_6 \; s(2)*u_6]^T$ | $[u_6 - s(2)*u_6]^T$ |
| $[u_3 \; s(2)*u_3]^T$ | $[u_3 - s(2)*u_3]^T$ | $[u_7 \; s(2)*u_7]^T$ | $[u_7 - s(2)*u_7]^T$ |
| $[u_4 \; s(2)*u_4]^T$ | $[u_4 - s(2)*u_4]^T$ | $[u_8 \; s(2)*u_8]^T$ | $[u_8 - s(2)*u_8]^T$ |
| or | | | |
| $[u_1 \; s(1)*u_1]^T$ | $[u_1 - s(1)*u_1]^T$ | $[u_5 \; s(1)*u_5]^T$ | $[u_5 - s(1)*u_5]^T$ |
| $[u_2 \; s(2)*u_2]^T$ | $[u_2 - s(2)*u_2]^T$ | $[u_6 \; s(2)*u_6]^T$ | $[u_6 - s(2)*u_6]^T$ |
| $[u_3 \; s(3)*u_3]^T$ | $[u_3 - s(3)*u_3]^T$ | $[u_7 \; s(3)*u_7]^T$ | $[u_7 - s(3)*u_7]^T$ |
| $[u_4 \; s(4)*u_4]^T$ | $[u_4 - s(4)*u_4]^T$ | $[u_8 \; s(4)*u_8]^T$ | $[u_8 - s(4)*u_8]^T$ |

The 8-dimensional vectors selected from the 8-dimensional vector set are the following thirty-two 8-dimensional vectors:

| | | | |
|---|---|---|---|
| $[u_1 \; s(1)*u_1]^T$ | $[u_1 - s(1)*u_1]^T$ | $[u_5 \; s(1)*u_5]^T$ | $[u_5 - s(1)*u_5]^T$ |
| $[u_2 \; s(1)*u_2]^T$ | $[u_2 - s(1)*u_2]^T$ | $[u_6 \; s(1)*u_6]^T$ | $[u_6 - s(1)*u_6]^T$ |
| $[u_3 \; s(1)*u_3]^T$ | $[u_3 - s(1)*u_3]^T$ | $[u_7 \; s(1)*u_7]^T$ | $[u_7 - s(1)*u_7]^T$ |
| $[u_4 \; s(1)*u_4]^T$ | $[u_4 - s(1)*u_4]^T$ | $[u_8 \; s(1)*u_8]^T$ | $[u_8 - s(1)*u_8]^T$ |
| $[u_1 \; s(2)*u_1]^T$ | $[u_1 - s(2)*u_1]^T$ | $[u_5 \; s(2)*u_5]^T$ | $[u_5 - s(2)*u_5]^T$ |
| $[u_2 \; s(2)*u_2]^T$ | $[u_2 - s(2)*u_2]^T$ | $[u_6 \; s(2)*u_6]^T$ | $[u_6 - s(2)*u_6]^T$ |
| $[u_3 \; s(2)*u_3]^T$ | $[u_3 - s(2)*u_3]^T$ | $[u_7 \; s(2)*u_7]^T$ | $[u_7 - s(2)*u_7]^T$ |
| $[u_4 \; s(2)*u_4]^T$ | $[u_4 - s(2)*u_4]^T$ | $[u_8 \; s(2)*u_8]^T$ | $[u_8 - s(2)*u_8]^T$ |

-continued or

| | | | |
|---|---|---|---|
| $[u_1 s(3)*u_1]^T$ | $[u_1 - s(3)*u_1]^T$ | $[u_5 s(3)*u_5]^T$ | $[u_5 - s(3)*u_5]^T$ |
| $[u_2 s(3)*u_2]^T$ | $[u_2 - s(3)*u_2]^T$ | $[u_6 s(3)*u_6]^T$ | $[u_6 - s(3)*u_6]^T$ |
| $[u_3 s(3)*u_3]^T$ | $[u_3 - s(3)*u_3]^T$ | $[u_7 s(3)*u_7]^T$ | $[u_7 - s(3)*u_7]^T$ |
| $[u_4 s(3)*u_4]^T$ | $[u_4 - s(3)*u_4]^T$ | $[u_8 s(3)*u_8]^T$ | $[u_8 - s(3)*u_8]^T$ |
| $[u_1 s(4)*u_1]^T$ | $[u_1 - s(4)*u_1]^T$ | $[u_5 s(4)*u_5]^T$ | $[u_5 - s(4)*u_5]^T$ |
| $[u_2 s(4)*u_2]^T$ | $[u_2 - s(4)*u_2]^T$ | $[u_6 s(4)*u_6]^T$ | $[u_6 - s(4)*u_6]^T$ |
| $[u_3 s(4)*u_3]^T$ | $[u_3 - s(4)*u_3]^T$ | $[u_7 s(4)*u_7]^T$ | $[u_7 - s(4)*u_7]^T$ |
| $[u_4 s(4)*u_4]^T$ | $[u_4 - s(4)*u_4]^T$ | $[u_8 s(4)*u_8]^T$ | $[u_8 - s(4)*u_8]^T$ |

In the pre-coding codebook, each codeword vector used to match the relevant channel, or the 8-dimensional vector of the first column of each codeword matrix used to match the relevant channel is obtained based on the 8-dimensional vectors selected from the 8-dimensional vector set.

When obtaining the codeword vectors or the first column of the codeword matrixes of the pre-coding codebook based on the 8-dimensional vectors selected from the 8-dimensional vector set, the selected 8-dimensional vectors are taken directly as the codeword vectors or the first column of the codeword matrixes of the pre-coding codebook; or when obtaining the codeword vectors or the first column of codeword matrixes of the pre-coding codebook based on the 8-dimensional vectors selected from the 8-dimensional vector set, the 8-dimensional vectors, acquired by multiplying all of the selected 8-dimensional vectors with a constant and/or row exchanging all of the selected 8-dimension) vectors in the same way, is taken as the codeword vectors or the first column of the codeword matrixes of the pre-coding codebook.

The method also comprises:

when the transmitting end uses single-polarized antenna, and regardless of whether performing row exchange, the transmitting end maps each row in the codeword with each antenna, mapping the rows at which the $1^{st}$, $5^{th}$, $2^{nd}$, $6^{th}$, $3^{rd}$, $7^{th}$, $4^{th}$, and $8^{th}$ elements of the selected 8-dimensional vector in the codeword are located in turn to each antenna arranged in turn from the outermost antenna; or when the transmitting end uses dual-polarized antenna, and regardless of whether performing row exchange, the transmitting end maps each row in the codeword with each antenna, mapping the rows at which the $1^{st}$ to $4^{th}$ elements of the selected 8-dimensional vector in the codeword are located in turn to the 4 antennas arranged in turn from the outermost antenna in the first polarization direction, and mapping the rows at which the $5^{th}$ to $8^{th}$ elements of the selected 8-dimensional vector in the codeword are located in turn to the 4 antennas arranged in turn from the outermost antenna in the second polarization direction, and the outmost antennas in the two polarization directions are adjacent.

When the rank of the channel matrix is equal to 1, in the pre-coding codebook there are $K_1$ codeword vectors, which are obtained based on $K_1$ 8-dimensional vectors selected from the 8-dimensional vector set, $K_1=8, 16, 32$ or $64$; or when the rank of the channel matrix is equal to 2, in the pre-coding codebook there are $K_2$ first column 8-dimensional vectors of the codeword matrixes, which are obtained based on $K_2$ 8-dimensional vectors selected from the 8-dimensional vector set, $K_2=8, 16, 32$ or $64$.

The information of the pre-coding codebook stored together in the transmitting end and the receiving end is data of part or all of the 4-dimensional vectors, which are used to calculate the selected 8-dimensional vectors, in $u_1$, $u_2$, $u_3$, $u_4$, $u_5$, $u_6$, $u_7$, $u_8$, s, m, n, and an algorithm for calculating the codeword in the pre-coding codebook according to these 4-dimensional vectors.

The pre-coding codebook is divided into a plurality of codebooks to be stored in the transmitting end and the receiving end, and index information corresponding to the codewords in the plurality of codebooks is fed back during feedback, wherein, the content indicated by the index information corresponding to the codewords in the plurality of codebooks constructs the pre-coding codebook via a function which is agreed by the transmitting end and the receiving end.

In order to solve the aforementioned problem, the present invention also provides a Multiple-Input Multiple-Output (MIMO) system with eight antennas, comprising a transmitting end and a receiving end, wherein, the transmitting end is configured to: store information of a pre-coding codebook which comprises a codeword obtained by using the aforementioned method, find out the codeword according to the serial number of the codeword fed back by the receiving end, and pre-code, by using the codeword, a symbol block sent to the receiving end;

the receiving end is configured to: store the pre-coding codebook, select a codeword from the pre-coding codebook according to an estimated channel matrix, and feed back the serial number of the codeword to the transmitting end.

In order to solve the aforementioned problem, the present invention also provides a method for constructing a codeword in a pre-coding codebook, applied to a Multiple-Input Multiple-Output (MIMO) system with eight antennas, and comprising:

defining eight 4-dimensional vectors $u_1 \sim u_8$ and one 4-dimensional vectors s, wherein:

$u_1=[1\ 1\ 1\ 1]^T$, $u_2=[1\ j\ -1\ -j]^T$, $u_3=[1\ -1\ 1\ -1]^T$, $u_4=[1\ -j\ -1\ j]^T$ $u_5=[1\ q0\ j\ q1]^T$, $u_6=[1\ q1\ -j\ -q0]^T$, $u_7=[1\ q2\ j\ q3]^T$, $u_8=[1\ q3\ -j\ q2]^T$ $s=[s(1)\ s(2)\ s(3)\ s(4)]=[1\ j\ q0\ q1]$;

wherein: $q0=(1+j)/\sqrt{2}$; $q1=(-1+j)/\sqrt{2}$; $q2=(-1-j)/\sqrt{2}$; $q3=(1-j)/\sqrt{2}$ $q0=(1+j)/\sqrt{2}$;

constructing one 8-dimensional vector set comprising a plurality of 8-dimensional vectors, n=1, 2, 3 or 4; and the 8-dimensional vector set is:

| | | | |
|---|---|---|---|
| $[u_1 s(n)*u_1]^T$ | $[u_1 -s(n)*u_1]^T$ | $[u_2 s(n)*u_2]^T$ | $[u_2 -s(n)*u_2]^T$ |
| $[u_3 s(n)*u_3]^T$ | $[u_3 -s(n)*u_3]^T$ | $[u_4 s(n)*u_4]^T$ | $[u_4 -s(n)*u_4]^T$ |
| $[u_5 s(n)*u_5]^T$ | $[u_5 -s(n)*u_5]^T$ | $[u_6 s(n)*u_6]^T$ | $[u_6 -s(n)*u_6]^T$ |
| $[u_7 s(n)*u_7]^T$ | $[u_7 -s(n)*u_7]^T$ | $[u_8 s(n)*u_8]^T$ | $[u_8 -s(n)*u_8]^T$ | and according to a rank of a channel matrix, constructing the codeword in the pre-coding codebook by using one of the following methods:

when the rank of the channel matrix is equal to 1, by using the same method as the method of any one of claims 1, 3, 4, 5, 6, 7, 8 and 9, selecting a plurality of 8-dimensional vectors from the 8-dimensional vector set, and obtaining the codeword vector for matching the relevant channel in the pre-coding codebook based on the selected 8-dimensional vectors, when the rank is equal to 2, the codeword for matching the relevant channel in the pre-coding codebook being two-column codeword matrix, and with the same method as the method of any one of claims 2, 3, 4, 5, 6, 7, 8 and 9, obtaining the first column 8-dimensional vectors of the codeword matrix based on the 8-dimensional vectors selected from the 8-dimensional vector set, and obtaining the second column 8-dimensional vectors of the codeword matrix based on the 8-dimensional vectors selected from the set consisting of $[mu_i\ nu_i]^T$ wherein, i=1~8, m,n∈{1, -1, j, -j, q1, q2, q3, q0}, and the first column and the second column of each codeword matrix are orthogonal.

The method for constructing a pre-coding codebook in accordance with the embodiment of the present invention provides the codewords for matching the relevant channel in the codebook when Rank=1 and Rank=2; with these codewords, in case of the single-polarized antenna and the dual-polarized antenna when Rank=1, a better wave beam is formed after pre-coding, and the quantitation error is small; on this basis, at the same time of ensuring the codebook nest characteristic, the codebook of Rank=2 is provided, which is also adaptable for the scenarios of both the single-polarized antenna and the dual-polarized antenna and has an excellent performance.

PREFERRED EMBODIMENTS OF THE PRESENT INVENTION

Figure 1:
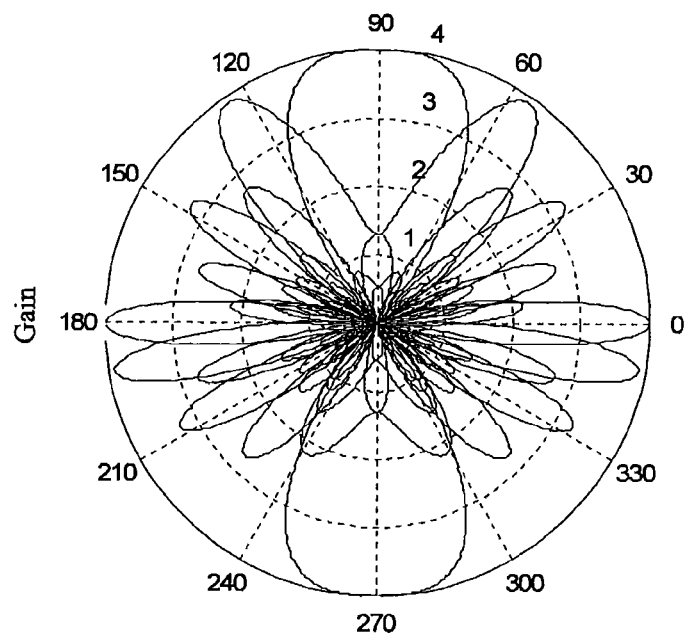
FIG. 1 is a wave beam pattern (including 8 codewords) of the single-polarized antenna when Rank=1 in the related art.

The present invention will be illustrated in detail in combination with the accompanying drawings and specific embodiments in the following.

A Multiple-Input Multiple-Output (MIMO) system with 8 antennas comprises a transmitting end and a receiving end; the transmitting end and the receiving end store information of a pre-coding codebook together, after the receiving end selects a codeword from the pre-coding codebook according to a channel matrix obtained by channel estimation, the receiving end feeds back a serial number of the codeword to the transmitting end, and the transmitting end pre-codes a symbol block sent to the receiving end according to the codeword found out by the serial number.

In this embodiment, when Rank=1, the codewords for matching the relevant channel in the information of the pre-coding codebook stored together by the transmitting end and the receiving end should be selected from a vector set U in table 5, and the set U is the set consisting of all vectors acquired corresponding to the cases of n=1, 2, 3, 4:

TABLE 5

| | |
|---|---|
| $[u_1 s(n) * u_1]^T$ | $[u_1 -s(n) * u_1]^T$ |
| $[u_2 s(n) * u_2]^T$ | $[u_2 -s(n) * u_2]^T$ |
| $[u_3 s(n) * u_3]^T$ | $[u_3 -s(n) * u_3]^T$ |
| $[u_4 s(n) * u_4]^T$ | $[u_4 -s(n) * u_4]^T$ |
| $[u_5 s(n) * u_5]^T$ | $[u_5 -s(n) * u_5]^T$ |
| $[u_6 s(n) * u_6]^T$ | $[u_6 -s(n) * u_6]^T$ |
| $[u_7 s(n) * u_7]^T$ | $[u_7 -s(n) * u_7]^T$ |
| $[u_8 s(n) * u_8]^T$ | $[u_8 -s(n) * u_8]^T$ |

Wherein, $u_1$~$u_8$ are eight vectors shown as Table 6:

TABLE 6

| | |
|---|---|
| $u_1 = [1\ 1\ 1\ 1]$ | $u_5 = [1\ q0\ j\ q1]$ |
| $u_2 = [1\ j\ -1\ -j]$ | $u_6 = [1\ q1\ -j\ -q0]$ |
| $u_3 = [1\ -1\ 1\ -1]$ | $u_7 = [1\ q2\ j\ q3]$ |
| $u_4 = [1\ -j\ -1\ j]$ | $u_8 = [1\ q3\ -j\ q2]$ |

Wherein, $q0 = (1+j)/\sqrt{2}$; $q1 = (-1+j)/\sqrt{2}$; $q2 = (-1-j)/\sqrt{2}$; $q3 = (1-j)/\sqrt{2}$.

In this embodiment, $s=[s(1)\ s(2)\ s(3)\ s(4)]=[1\ j\ q0\ q1]$.

The 4-dimensional vector $u_i$ can express as: $u_i=[u_i(1)\ u_i(2)\ u_i(3)\ u_i(4)]$, i=1, 2 . . . , 8, and according to the vector rule of operation, there is:

$[u_i\ s(n)*u_i]=[u_i(1)\ u_i(2)\ u_i(3)\ u_i(4)\ s(n)*u_i(1)\ s(n)*u_i(2)\ s(n)*u_i(3)\ s(n)*u_i(4)]$ $[u_i\ -s(n)*u_i]=[u_i(1)\ u_i(2)\ u_i(3)\ u_i(4)\ -s(n)*u_i(1)\ -s(n)*u_i(2)\ -s(n)*u_i(3)\ -s(n)*u_i(4)]$

Assuming that in the pre-coding codebook the codeword for matching the relevant channel is K, and K is smaller than or equal to the number of codewords in the codebook, which is generally 8, 16, 32, 64, and so on.

In one example, K=8, the codewords for matching the relevant channel and comprised in the codebook are shown as table 7:

TABLE 7

| | |
|---|---|
| $[u_1 s(n) * u_1]^T$ | $[u_1 -s(n) * u_1]^T$ |
| $[u_2 s(n) * u_2]^T$ | $[u_2 -s(n) * u_2]^T$ |
| $[u_3 s(n) * u_3]^T$ | $[u_3 -s(n) * u_3]^T$ |
| $[u_4 s(n) * u_4]^T$ | $[u_4 -s(n) * u_4]^T$ |

Wherein, when n = 1, or 2, or 3, or 4, four kinds of codebooks are respectively obtained.

There might be also a mixed case, that is, corresponding to different direction vectors ($u_1$, $u_2$, $u_3$, $u_4$ are 4 direction vectors), the value of n is different, thus more different codebooks can be obtained with combining. An example is given as table 8.

TABLE 8

| | |
|---|---|
| $[u_1 s(1) * u_1]^T$ | $[u_1 -s(1) * u_1]^T$ |
| $[u_2 s(3) * u_2]^T$ | $[u_2 -s(3) * u_2]^T$ |
| $[u_3 s(2) * u_3]^T$ | $[u_3 -s(2) * u_3]^T$ |
| $[u_4 s(4) * u_4]^T$ | $[u_4 -s(4) * u_4]^T$ |

Or, the codewords for matching the relevant channel and comprised in the codebook are shown as table 9:

TABLE 9

| | |
|---|---|
| $[u_5 s(n) * u_5]^T$ | $[u_5 -s(n) * u_5]^T$ |
| $[u_6 s(n) * u_6]^T$ | $[u_6 -s(n) * u_6]^T$ |
| $[u_7 s(n) * u_7]^T$ | $[u_7 -s(n) * u_7]^T$ |
| $[u_8 s(n) * u_8]^T$ | $[u_8 -s(n) * u_8]^T$ |

When n = 1, or 2, or 3, or 4, another four kinds of codebooks are obtained respectively.

Similarly, there might be also a mixed case, in which, corresponding to different direction vectors, the value of n is different, thus more different codebooks can be obtained with combining. An example is shown as table 10:

TABLE 10

| | |
|---|---|
| $[u_5 s(1) * u_5]^T$ | $[u_5 -s(1) * u_5]^T$ |
| $[u_6 s(3) * u_6]^T$ | $[u_6 -s(3) * u_6]^T$ |
| $[u_7 s(2) * u_7]^T$ | $[u_7 -s(2) * u_7]^T$ |
| $[u_8 s(4) * u_8]^T$ | $[u_8 -s(4) * u_8]^T$ |

Figure 4:
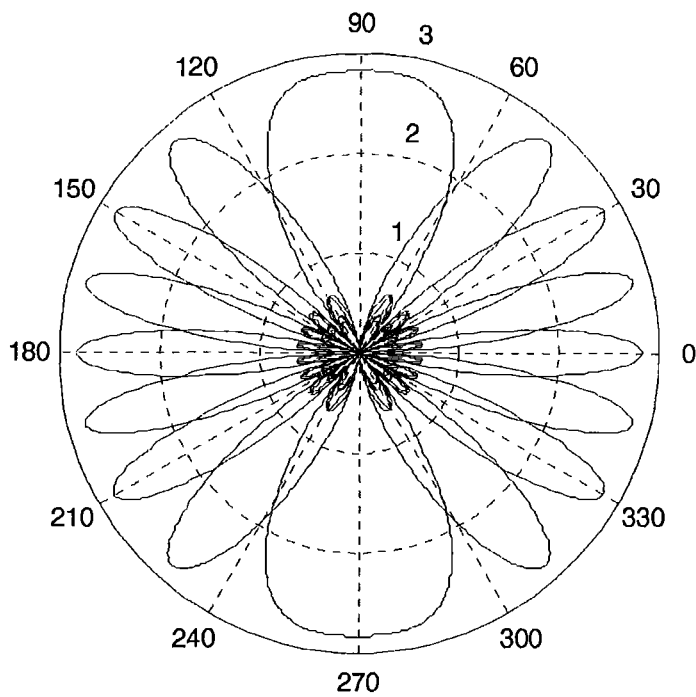
FIG. 4 is a wave beam pattern of the single-polarized antenna in an example when K=8 in accordance with an embodiment of the present invention.

FIG. 4 is a wave beam pattern of the single-polarized antenna obtained with the aforementioned codewords in the case of the single-polarized antenna and the relevant channel, and it can be seen from FIG. 4 that a strong directional wave beam is formed.

In another example, when K=16, the codebook comprises 16 codewords for matching the relevant channel, and the 16 codewords are shown as table 11:

TABLE 11

| $[u_1 s(1) * u_1]^T$ | $[u_1 -s(1) * u_1]^T$ | $[u_1 s(2) * u_1]^T$ | $[u_1 -s(2) * u_1]^T$ |
|---|---|---|---|
| $[u_2 s(1) * u_2]^T$ | $[u_2 -s(1) * u_2]^T$ | $[u_2 s(2) * u_2]^T$ | $[u_2 -s(2) * u_2]^T$ |
| $[u_3 s(1) * u_3]^T$ | $[u_3 -s(1) * u_3]^T$ | $[u_3 s(2) * u_3]^T$ | $[u_3 -s(2) * u_3]^T$ |
| $[u_4 s(1) * u_4]^T$ | $[u_4 -s(1) * u_4]^T$ | $[u_4 s(2) * u_4]^T$ | $[u_4 -s(2) * u_4]^T$ | or shown as table 12:

TABLE 12

| $[u_1 s(3) * u_1]^T$ | $[u_1 -s(3) * u_1]^T$ | $[u_1 s(4) * u_1]^T$ | $[u_1 -s(4) * u_1]^T$ |
|---|---|---|---|
| $[u_2 s(3) * u_2]^T$ | $[u_2 -s(3) * u_2]^T$ | $[u_2 s(4) * u_2]^T$ | $[u_2 -s(4) * u_2]^T$ |
| $[u_3 s(3) * u_3]^T$ | $[u_3 -s(3) * u_3]^T$ | $[u_3 s(4) * u_3]^T$ | $[u_3 -s(4) * u_3]^T$ |
| $[u_4 s(3) * u_4]^T$ | $[u_4 -s(3) * u_4]^T$ | $[u_4 s(4) * u_4]^T$ | $[u_4 -s(4) * u_4]^T$ | or shown as table 13:

TABLE 13

| $[u_5 s(1) * u_5]^T$ | $[u_5 -s(1) * u_5]^T$ | $[u_5 s(2) * u_5]^T$ | $[u_5 -s(2) * u_5]^T$ |
|---|---|---|---|
| $[u_6 s(1) * u_6]^T$ | $[u_6 -s(1) * u_6]^T$ | $[u_6 s(2) * u_6]^T$ | $[u_6 -s(2) * u_6]^T$ |
| $[u_7 s(1) * u_7]^T$ | $[u_7 -s(1) * u_7]^T$ | $[u_7 s(2) * u_7]^T$ | $[u_7 -s(2) * u_7]^T$ |
| $[u_8 s(1) * u_8]^T$ | $[u_8 -s(1) * u_8]^T$ | $[u_8 s(2) * u_8]^T$ | $[u_8 -s(2) * u_8]^T$ | or shown as table 14:

TABLE 14

| $[u_5 s(3) * u_5]^T$ | $[u_5 -s(3) * u_5]^T$ | $[u_5 s(4) * u_5]^T$ | $[u_5 -s(4) * u_5]^T$ |
|---|---|---|---|
| $[u_6 s(3) * u_6]^T$ | $[u_6 -s(3) * u_6]^T$ | $[u_6 s(4) * u_6]^T$ | $[u_6 -s(4) * u_6]^T$ |
| $[u_7 s(3) * u_7]^T$ | $[u_7 -s(3) * u_7]^T$ | $[u_7 s(4) * u_7]^T$ | $[u_7 -s(4) * u_7]^T$ |
| $[u_8 s(3) * u_8]^T$ | $[u_8 -s(3) * u_8]^T$ | $[u_8 s(4) * u_8]^T$ | $[u_8 -s(4) * u_8]^T$ | or shown as table 15:

TABLE 15

| $[u_1 s(1) * u_1]^T$ | $[u_1 -s(1) * u_1]^T$ | $[u_5 s(1) * u_5]^T$ | $[u_5 -s(1) * u_5]^T$ |
|---|---|---|---|
| $[u_2 s(1) * u_2]^T$ | $[u_2 -s(1) * u_2]^T$ | $[u_6 s(1) * u_6]^T$ | $[u_6 -s(1) * u_6]^T$ |
| $[u_3 s(1) * u_3]^T$ | $[u_3 -s(1) * u_3]^T$ | $[u_7 s(1) * u_7]^T$ | $[u_7 -s(1) * u_7]^T$ |
| $[u_4 s(1) * u_4]^T$ | $[u_4 -s(1) * u_4]^T$ | $[u_8 s(1) * u_8]^T$ | $[u_8 -s(1) * u_8]^T$ |

Figure 5:
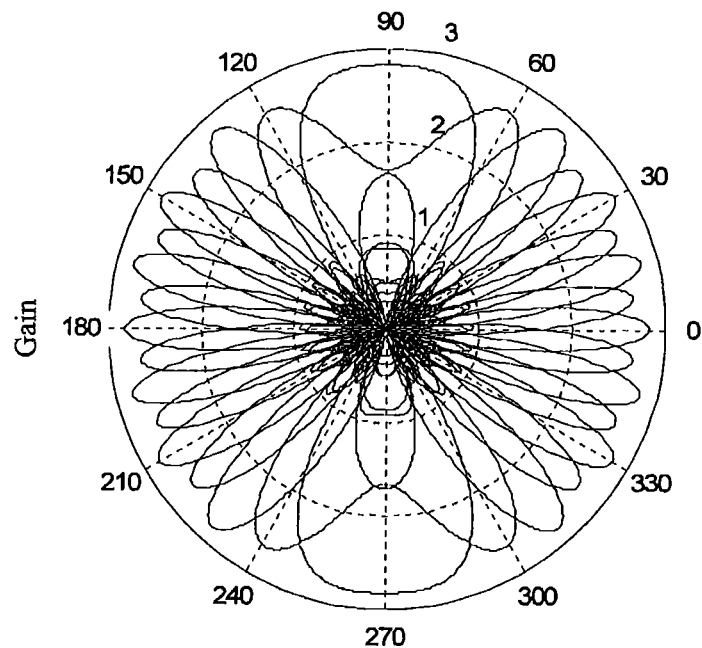
FIG. 5 is a wave beam pattern of the single-polarized antenna in an example when K=16 in accordance with an embodiment of the present invention.

FIG. 5 is a wave beam pattern of the single-polarized antenna obtained with the aforementioned codewords in the case of the single-polarized antenna and the relevant channel, and it can be seen from FIG. 5 that a strong directional wave beam is formed.

Or, when K=16, the 16 codewords for matching the relevant channel and comprised in the codebook are shown as table 16:

TABLE 16

| $[u_1 s(2) * u_1]^T$ | $[u_1 -s(2) * u_1]^T$ | $[u_5 s(2) * u_5]^T$ | $[u_5 -s(2) * u_5]^T$ |
|---|---|---|---|
| $[u_2 s(2) * u_2]^T$ | $[u_2 -s(2) * u_2]^T$ | $[u_6 s(2) * u_6]^T$ | $[u_6 -s(2) * u_6]^T$ |
| $[u_3 s(2) * u_3]^T$ | $[u_3 -s(2) * u_3]^T$ | $[u_7 s(2) * u_7]^T$ | $[u_7 -s(2) * u_7]^T$ |
| $[u_4 s(2) * u_4]^T$ | $[u_4 -s(2) * u_4]^T$ | $[u_8 s(2) * u_8]^T$ | $[u_8 -s(2) * u_8]^T$ | or shown as table 17:

TABLE 17

| $[u_1 s(1) * u_1]^T$ | $[u_1 -s(1) * u_1]^T$ | $[u_5 s(1) * u_5]^T$ | $[u_5 -s(1) * u_5]^T$ |
|---|---|---|---|
| $[u_2 s(3) * u_2]^T$ | $[u_2 -s(3) * u_2]^T$ | $[u_6 s(3) * u_6]^T$ | $[u_6 -s(3) * u_6]^T$ |
| $[u_3 s(2) * u_3]^T$ | $[u_3 -s(2) * u_3]^T$ | $[u_7 s(2) * u_7]^T$ | $[u_7 -s(2) * u_7]^T$ |
| $[u_4 s(4) * u_4]^T$ | $[u_4 -s(4) * u_4]^T$ | $[u_8 s(4) * u_8]^T$ | $[u_8 -s(4) * u_8]^T$ |

Figure 6:
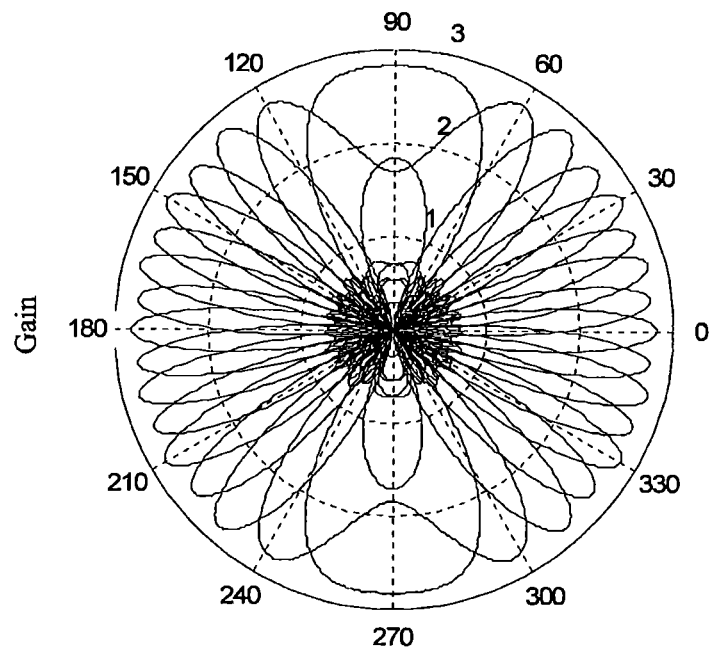
FIG. 6 is a wave beam pattern of the single-polarized antenna in another example when K=16 in accordance with an embodiment of the present invention.

FIG. 6 is a wave beam pattern of the single-polarized antenna obtained with the aforementioned codewords in the case of the single-polarized antenna and the relevant channel, and it can be seen from FIG. 6 that a strong directional wave beam is formed.

In another example, when K=32, the codewords for matching the relevant channel and comprised in the codebook are shown as table 18:

TABLE 18

| $[u_1 s(1) * u_1]^T$ | $[u_1 -s(1) * u_1]^T$ | $[u_5 s(1) * u_5]^T$ | $[u_5 -s(1) * u_5]^T$ |
|---|---|---|---|
| $[u_2 s(1) * u_2]^T$ | $[u_2 -s(1) * u_2]^T$ | $[u_6 s(1) * u_6]^T$ | $[u_6 -s(1) * u_6]^T$ |
| $[u_3 s(1) * u_3]^T$ | $[u_3 -s(1) * u_3]^T$ | $[u_7 s(1) * u_7]^T$ | $[u_7 -s(1) * u_7]^T$ |
| $[u_4 s(1) * u_4]^T$ | $[u_4 -s(1) * u_4]^T$ | $[u_8 s(1) * u_8]^T$ | $[u_8 -s(1) * u_8]^T$ |
| $[u_1 s(2) * u_1]^T$ | $[u_1 -s(2) * u_1]^T$ | $[u_5 s(2) * u_5]^T$ | $[u_5 -s(2) * u_5]^T$ |
| $[u_2 s(2) * u_2]^T$ | $[u_2 -s(2) * u_2]^T$ | $[u_6 s(2) * u_6]^T$ | $[u_6 -s(2) * u_6]^T$ |
| $[u_3 s(2) * u_3]^T$ | $[u_3 -s(2) * u_3]^T$ | $[u_7 s(2) * u_7]^T$ | $[u_7 -s(2) * u_7]^T$ |
| $[u_4 s(2) * u_4]^T$ | $[u_4 -s(2) * u_4]^T$ | $[u_8 s(2) * u_8]^T$ | $[u_8 -s(2) * u_8]^T$ | or shown as table 19:

TABLE 19

| $[u_1 s(3) * u_1]^T$ | $[u_1 -s(3) * u_1]^T$ | $[u_5 s(3) * u_5]^T$ | $[u_5 -s(3) * u_5]^T$ |
|---|---|---|---|
| $[u_2 s(3) * u_2]^T$ | $[u_2 -s(3) * u_2]^T$ | $[u_6 s(3) * u_6]^T$ | $[u_6 -s(3) * u_6]^T$ |
| $[u_3 s(3) * u_3]^T$ | $[u_3 -s(3) * u_3]^T$ | $[u_7 s(3) * u_7]^T$ | $[u_7 -s(3) * u_7]^T$ |
| $[u_4 s(3) * u_4]^T$ | $[u_4 -s(3) * u_4]^T$ | $[u_8 s(3) * u_8]^T$ | $[u_8 -s(3) * u_8]^T$ |
| $[u_1 s(4) * u_1]^T$ | $[u_1 -s(4) * u_1]^T$ | $[u_5 s(4) * u_5]^T$ | $[u_5 -s(4) * u_5]^T$ |
| $[u_2 s(4) * u_2]^T$ | $[u_2 -s(4) * u_2]^T$ | $[u_6 s(4) * u_6]^T$ | $[u_6 -s(4) * u_6]^T$ |
| $[u_3 s(4) * u_3]^T$ | $[u_3 -s(4) * u_3]^T$ | $[u_7 s(4) * u_7]^T$ | $[u_7 -s(4) * u_7]^T$ |
| $[u_4 s(4) * u_4]^T$ | $[u_4 -s(4) * u_4]^T$ | $[u_8 s(4) * u_8]^T$ | $[u_8 -s(4) * u_8]^T$ |

The transmission data is pre-coded with these vectors in the relevant channel, which not only can form a strong directional wave beam in the case of the single-polarized antenna, but also in the case of the dual-polarized antenna can form a strong directional wave beam with concentrated power and small sidelobes in the dimension of each polarization direction. According to the simulation experimental result for calculating the quantitation matching degree in the field, with the aforementioned codewords of the present invention, in the case of the dual-polarized antenna, strong relevant channel and Rank=1, the average quantitation matching degree is more than 0.6, up to 0.9, and the pre-coding performance is good.

In another embodiment, when Rank=2, the codewords for matching the relevant channel in the pre-coding codebook adopted by this embodiment are two-column codeword matrixes, in which the first column is selected from the set U, and the second column is selected from a set consisting of $[mu_i \; nu_i]^T$, where i=1~8, m,n∈{1, -1, j, -j, q1, q2, q3, q0}. Furthermore, when Rank=2, the first column and the second column of the codeword matrix are orthogonal.

For the codewords described in each aforementioned embodiment, they can be multiplied by a constant to be expanded, while the performance is not affected. The value range of the absolute value of the constant is reasonably within (0 1), for example, it might be a letter of 8PSK or also can be $$\frac{1}{\sqrt{2}}, \frac{1}{2}, \frac{1}{2\sqrt{2}}$$

and so on. For the codewords of Rank=2, each column can be multiplied by the same constant or different constants to be expanded, and the specific value of the constant relates to the power. All of transformations should belong to the scope of the present invention.

Figure 2A:
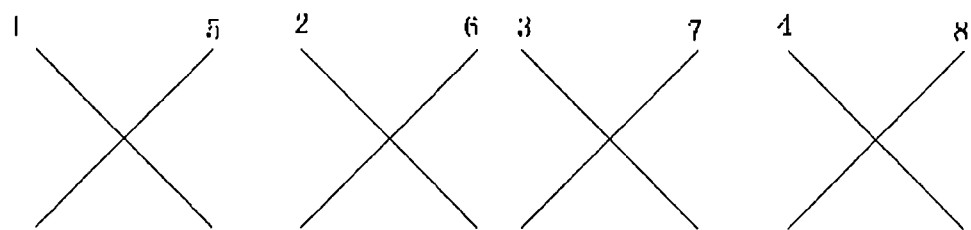
FIG. 2a is a schematic diagram of an antenna model in accordance with an embodiment of the present invention.

FIG. 2a illustrates the mapping relationship between the codewords and the antennas given in the aforementioned embodiment when the transmitting end uses the dual-polarized antenna, and the number beside each antenna indicates the row number of the codewords to which the antenna is mapped. As shown in FIG. 2a: the $1^{st}$ to $4^{th}$ rows of the codewords (that is, the $1^{st}$ to $4^{th}$ elements of the selected 8-dimensional vector) are in turn mapped to 4 antennas arranged in turn from the outermost antenna in the first polarization direction; and the $5^{th}$ to $8^{th}$ rows of the codewords (that is, the $5^{th}$ to $8^{th}$ elements of the selected 8-dimensional vector) are in turn mapped to 4 antennas arranged in turn from the outermost antenna in the second polarization direction, and the outmost antennas in the two polarization directions are adjacent. In the figure, the antennas in each polarization direction are arranged with equal interval.

In other embodiments, the codewords in the pre-coding codebook can also be obtained by row exchanging the selected 8-dimensional vectors, as long as it is ensured that the rows in which the $1^{st}$ to $4^{th}$ elements of the selected 8-dimensional vector are located are in turn mapped to the 4 antennas arranged in turn from the outermost antenna in the first polarization direction, and the rows in which the $5^{th}$ to $8^{th}$ elements of the selected 8-dimensional vector are located are in turn mapped to the 4 antennas arranged in turn from the outermost antenna in the second polarization direction. The pre-coding performance would not be affected.

For example, it is assumed that the codeword vector constructed in the aforementioned embodiment is:

$u_k = [u_k(1)\ u_k(2)\ u_k(3)\ u_k(4)\ u_k(5)\ u_k(6)\ u_k(7)\ u_k(8)]^T$

In another embodiment, after rearranging the aforementioned codeword vector, it is assumed that the obtained codeword vector is:

$u_k' = [u_k(1)\ u_k(5)\ u_k(2)\ u_k(6)\ u_k(3)\ u_k(7)\ u_k(4)\ u_k(8)]^T$ wherein, k=0, 1, . . . , K, and K is the number of codewords for matching the relevant channel.

Figure 2B:
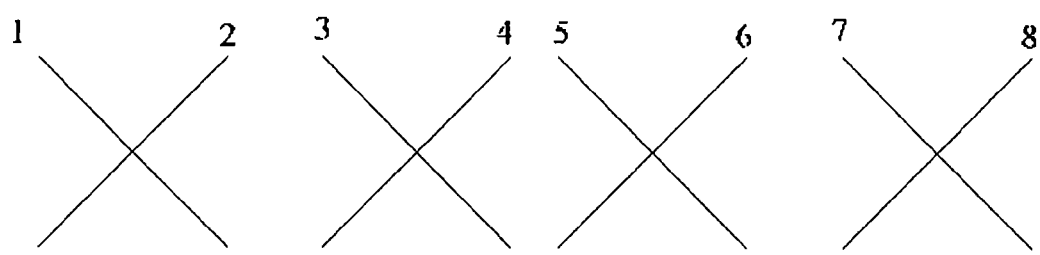
FIG. 2b is a schematic diagram of another antenna model in accordance with an embodiment of the present invention.

At this time, the mapping relationship between each row in the codeword and the antenna needs to be adjusted, and the adjusted mapping relationship is shown as FIG. 2b, wherein, the 4 antennas arranged with equal interval in the first polarization direction are in turn mapped to the $1^{st}$, $3^{rd}$, $5^{th}$, $7^{th}$ rows of the new codeword, and the 4 antennas arranged with equal interval in the second polarization direction are in turn mapped to the $2^{nd}$, $4^{th}$, $6^{th}$, $8^{th}$ rows of the codeword. However, the mapping relationship between the row in which each element of the selected 8-dimensional vector is located and the antenna in the space is not changed. For example, in both FIG. 2a and FIG. 2b, the row where $u_k(2)$ is located corresponds to the $2^{nd}$ antenna started from the left side in the first polarization direction.

Similarly, in the case that the transmitting end uses the single-polarized antenna, regardless of whether performing row exchanging, when the transmitting end maps each row of the codeword with each antenna, the transmitting end only needs to in turn maps the rows in which the $1^{st}$, $5^{th}$, $2^{nd}$, $6^{th}$, $3^{rd}$, $7^{th}$, $4^{th}$, and $8^{th}$ elements of the selected 8-dimensional vector in the codebook are located to the antennas arranged in turn from the outermost antenna.

It should be emphasized that, regardless of using the single-polarized antenna or the dual-polarized antenna, all the codewords selected from the vector set should perform row exchanging in the same way.

Figure 3:
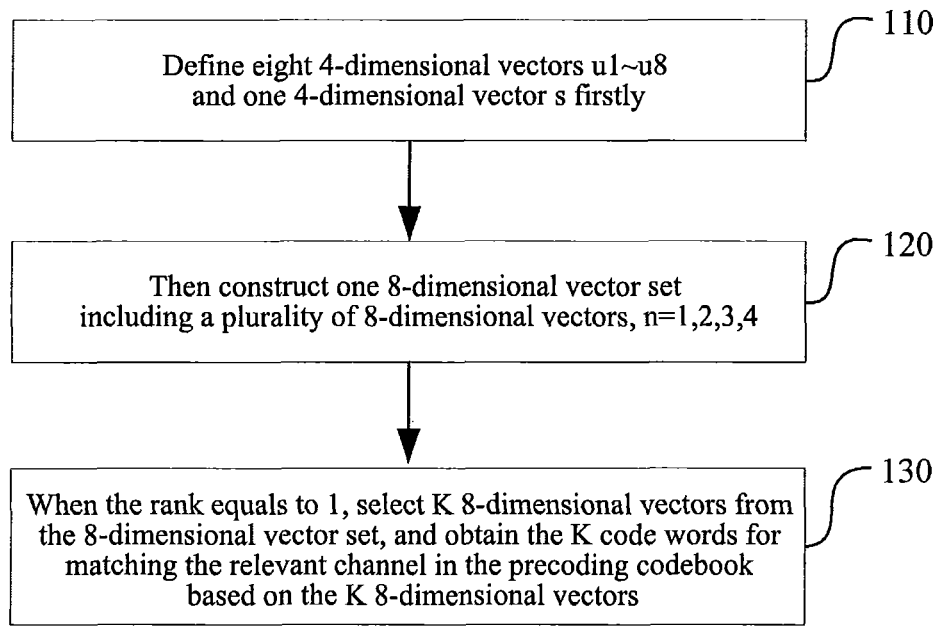
FIG. 3 is a flow chart of a method for constructing codewords for matching the relevant channel in accordance with an embodiment of the present invention.

Correspondingly, the method for constructing the codewords for matching the relevant channel in the pre-coding codebook is shown as FIG. 3, and the method comprises the following steps:

Step 110, firstly define eight 4-dimensional vectors $u_1 \sim u_8$ and one 4-dimensional vector s, comprising:

$u_1=[1\ 1\ 1\ 1]^T$, $u_2=[1\ j\ -1\ -j]^T$, $u_3=[1\ -1\ 1\ -1]^T$, $u_4=[1\ -j\ -1\ j]^T$ $u_5=[1\ q0\ j\ q1]^T$, $u_6=[1\ q1\ -j\ -q0]^T$, $u_7=[1\ q2\ j\ q3]^T$, $u_8=[1\ q3\ -j\ q2]^T$ $s=[s(1)\ s(2)\ s(3)\ s(4)]=[1\ j\ q0\ q1]$:

wherein: $q0=(1+j)/\sqrt{2}$; $q1=(-1+j)/\sqrt{2}$; $q2=(-1-j)/\sqrt{2}$; $q3=(1-j)/\sqrt{2}$ $q0=(1+j)/\sqrt{2}$;

Step 120, then, construct one 8-dimensional vector set including a plurality of 8-dimensional vectors, n=1, 2, 3, 4, comprising:

$[u_1\ s(n)\ *\ u_1]^T, [u_1\ -s(n)\ *\ u_1]^T, [u_2\ s(n)\ *\ u_2]^T, [u_2\ -s(n)\ *\ u_2]^T$
$[u_3\ s(n)\ *\ u_3]^T, [u_3\ -s(n)\ *\ u_3]^T, [u_4\ s(n)\ *\ u_4]^T, [u_4\ -s(n)\ *\ u_4]^T$
$[u_5\ s(n)\ *\ u_5]^T, [u_5\ -s(n)\ *\ u_5]^T, [u_6\ s(n)\ *\ u_6]^T, [u_6\ -s(n)\ *\ u_6]^T$
$[u_7\ s(n)\ *\ u_7]^T, [u_7\ -s(n)\ *\ u_7]^T, [u_8\ s(n)\ *\ u_8]^T, [u_8\ -s(n)\ *\ u_8]^T$

Step 130, when the rank is equal to 1, select K 8-dimensional vectors from the 8-dimensional vectors set, and based on the K 8-dimensional vectors, obtain K codewords for matching the relevant channel in the pre-coding codebook.

The method for selecting the K 8-dimensional vectors from the 8-dimensional vector set and obtaining the codewords for matching the relevant channel in the pre-coding codebook based on the K 8-dimensional vectors is described in detail above and is not repeated here.

When the rank is equal to 2, the codewords for matching the relevant channel in the pre-coding codebook are two-column codeword matrixes, with the same method as mentioned above, based on the 8-dimensional vectors selected from the 8-dimensional vector set, the first column 8-dimensional vectors of the codeword matrixes for matching the relevant channel are obtained, and based on the K 8-dimensional vectors selected from the set consisting of $[mu_i\ nu_i]^T$, the second column 8-dimensional vectors of the K codeword matrixes are obtained, where i=1~8, m,n∈{1, -1, j, -j, q1, q2, q3, q0}, and the first column and the second column of each codeword matrix are orthogonal.

It should be noted that, although the 8-dimensional vectors provided in the present embodiment are used to obtain the codeword vectors or codeword matrixes for matching the relevant channel in the pre-coding codebook, these codewords should not be understood as the codewords for dedicating to match the relevant channel, and the codeword vectors or codeword matrixes for matching the irrelevant channel might also use these codewords.

In the aforementioned embodiments, the codewords for matching the relevant channel adopted in the codebook of Rank=1 and Rank=2 can be calculated and acquired based on some existing 4-dimensional vectors, and the construction is convenient. Therefore, in the aforementioned embodiments of the present invention, the information of the pre-coding codebook stored together by the transmitting end and the receiving end might be the final codewords, or part or all of data of the 4-dimensional vectors for calculating the selected 8-dimensional vectors in $u_1$, $u_2$, $u_3$, $u_4$, $u_5$, $u_6$, $u_7$, $u_8$, s, m, n, as well as the algorithm for calculating the codewords in the pre-coding codebook according to these 4-dimensional vectors. At this time, since it does not need to store a lot of codebooks, the storage space can be saved, and it's very important for the commercialization of the precious devices, such as terminals, for storing resources.

In the aforementioned embodiments, the codewords for matching the relevant channel used in the codebook of Rank=1 and Rank=2 are able to be pre-coded to form good wave beam in the case of the single-polarized antenna and the dual-polarized antenna when Rank=1, and the quantitation error is small. On this basis, at the same time of ensuring the codebook nest characteristic, it can be adaptable to the scenarios of the single-polarized antenna and the dual-polarized antenna when Rank=2, thus it has an excellent performance.

The equivalent transformation of the aforementioned embodiments might be:

the information of the above pre-coding codebook might be divided to be stored, for example:

the information of the pre-coding codebook stored together by the transmitting end and the receiving end is the data of part or all of data of the 4-dimensional vectors for calculating the selected 8-dimensional vectors in vectors in $u_1$, $u_2$, $u_3$, $u_4$, $u_5$, $u_6$, $u_7$, $u_8$, s, m, n, as well as the algorithm for calculating the codewords in the pre-coding codebook according to these 4-dimensional vectors.

For the feedback method, it is very easy to find out the codeword W that needs to be fed back having the structure of $[u_i\ s(n)*u_i]^T$ or $[u_i\ -s(n)*u_i]^T$, and the codeword might also be divided to feed back;

the index corresponds to W is fed back, and the equivalent alternative might be:

feeding back one index and finding out the corresponding W1 from the codebook C1, and feeding back another index and finding out the corresponding W2 from the codebook C2, W=f(W1,W2), where f is a function, for example:

it needs to feed back W:

$$W = \begin{bmatrix} u_1 & O \\ O & u_1 \end{bmatrix} \times \begin{bmatrix} 1 \\ -1 \end{bmatrix},$$

and the actually fed-back W is W1=$u_i$ or $$\begin{bmatrix} u_1 & O \\ O & u_1 \end{bmatrix}, W2 = \begin{bmatrix} 1 \\ -1 \end{bmatrix},$$

and the transmitting end and the receiving end agree on the function relationship f;

or might be:

feeding back one index and finding out the corresponding W1 from the codebook C1, and fixing the value of W2, W=f(W1,W2), where f is a function, for example:

the W that needs to be fed back is $$W = \begin{bmatrix} u_1 & O \\ O & u_1 \end{bmatrix} \times \begin{bmatrix} 1 \\ -1 \end{bmatrix},$$

and the actually fed-back W is $$W1 = u_1 \text{ or } \begin{bmatrix} u_1 & O \\ O & u_1 \end{bmatrix},$$

and the fixed $$W2 = \begin{bmatrix} 1 \\ -1 \end{bmatrix};$$

the transmitting end and receiving end can agree on the function relationship f.

The application scope of the aforementioned embodiments is that, in the LTE standard, the smallest feedback unit of the channel information is subband, one subband consists of a plurality of Resource Blocks (RBs), each RB consists of a plurality of Resource Elements (REs), and the RE is the smallest unit of time-frequency resources in the LTE; and in LTE-A the resource representation method of the LTE continues to use.

The aforementioned codebook can be applied to the broadband channel information feedback, and can also be applied to the subband channel information feedback. Based on the above feedback, the feedback information of other codebooks can be further enhanced to improve the precision, such as the differential codebook.

For those skilled in the art, it can be understood that all or part of the steps in the aforementioned method can be implemented by programs instructing the relevant hardware, and the programs can be stored in a computer readable storage medium, such as a Read-Only-Memory, a magnetic disk or an optical disk, and so on. Optionally, all or part of the steps of the aforementioned embodiments can be implemented with one or more integrated circuits. Accordingly, each module/unit in the aforementioned embodiments can be implemented either in the form of hardware or in the form of software function module. The present invention is not limited to any specific form of the combination of the hardware and software.

INDUSTRIAL APPLICABILTY

The method for constructing a pre-coding codebook in accordance with the present invention provides the codewords for matching the relevant channel in the codebook when Rank=1 and Rank=2; with these codewords, in case of the single-polarized antenna and the dual-polarized antenna when Rank=1, a better wave beam is formed after pre-coding, and the quantitation error is small; on this basis, at the same time of ensuring the codebook nest characteristic, the codebook of Rank=2 is provided, which is also adaptable for the scenarios of both the single-polarized antenna and the dual-polarized antenna and has an excellent performance.

What is claimed is:

1. A pre-coding method, applied to a Multiple-Input Multiple-Output (MIMO) system with eight antennas, and comprising:

a transmitting end and a receiving end storing information of a pre-coding codebook together, the receiving end selecting a codeword from the pre-coding codebook according to an estimated channel matrix and feeding back a serial number of the codeword to the transmitting end, and the transmitting end finding out the codeword according to the serial number and pre-coding, by using the codeword, a symbol block sent to the receiving end; wherein, at least eight codeword vectors or column vectors in at least eight codeword matrixes in the pre-coding codebook are obtained based on 8-dimensional vectors selected from the following 8-dimensional vector set:

$$[u_1\ s(n)*u_1]^T, [u_1\ -s(n)*u_1]^T, [u_2\ s(n)*u_2]^T, [u_2\ -s(n)*u_2]^T$$
$$[u_3\ s(n)*u_3]^T, [u_3\ -s(n)*u_3]^T, [u_4\ s(n)*u_4]^T, [u_4\ -s(n)*u_4]^T$$
$$[u_5\ s(n)*u_5]^T, [u_5\ -s(n)*u_5]^T, [u_6\ s(n)*u_6]^T, [u_6\ -s(n)*u_6]^T$$
$$[u_7\ s(n)*u_7]^T, [u_7\ -s(n)*u_7]^T, [u_8\ s(n)*u_8]^T, [u_8\ -s(n)*u_8]^T$$

wherein,
$u_1=[1\ 1\ 1\ 1]^T$, $u_2=[1\ j\ -1\ -j]^T$, $u_3=[1\ -1\ 1\ -1]^T$, $u_4=[1\ -j\ -1\ j]^T$
$u_5=[1\ q0\ j\ q1]^T$, $u_6=[1\ q1\ -j\ -q0]^T$, $u_7=[1\ q2\ j\ q3]^T$, $u_8=[1\ q3\ -j\ q2]^T$
$q0=(1+j)/\sqrt{2}$; $q1=(-1+j)/\sqrt{2}$; $q2=(-1-j)/\sqrt{2}$; $q3=(1-j)/\sqrt{2}$;
$s(n)$ is an element in vectors, $n=1,2,3,4$, and $s=[s(1)\ s(2)\ s(3)\ s(4)]=[1\ j\ q0\ q1]$.

2. The method of claim 1, wherein,
the rank of the channel matrix is equal to 1, and the codeword of the pre-coding codebook is the 8-dimensional codeword vector, wherein at least part of the codeword vectors are obtained based on the 8-dimensional vectors selected from the 8-dimensional vector set; or
the rank of the channel matrix is equal to 2, the codeword of the pre-coding codebook is two-column codeword matrix, and in the pre-coding codebook, the first column 8-dimensional vectors of at least part of the codeword matrixes are obtained based on the 8-dimensional vectors selected from the 8-dimensional vector set; and the second column 8-dimensional vectors of at least part of the codeword matrixes are obtained based on the 8-dimensional vectors selected from a set consisting of $[mu_i\ nu_i]^T$, where $i=1\sim 8$, $m,n \in \{1, -1, j, -j, q1, q2, q3, q0\}$; and the first column and the second column of each codeword matrix are orthogonal.

3. The method of claim 2, wherein,
when the rank of the channel matrix is equal to 1, in the pre-coding codebook there are $K_1$ codeword vectors, which are obtained based on $K_1$ 8-dimensional vectors selected from the 8-dimensional vector set, $K_1=8, 16, 32$ or 64; or
when the rank of the channel matrix is equal to 2, in the pre-coding codebook there are $K_2$ first column 8-dimensional vectors of the codeword matrixes, which are obtained based on $K_2$ 8-dimensional vectors selected from the 8-dimensional vector set, $K_2=8, 16, 32$ or 64.

4. The method of claim 2, wherein, the 8-dimensional vectors selected from the 8-dimensional vector set are the following eight 8-dimensional vectors:

$$[u_1\ s(n)*u_1]^T, [u_1\ -s(n)*u_1]^T, [u_2\ s(n)*u_2]^T, [u_2\ -s(n)*u_2]^T$$
$$[u_3\ s(n)*u_3]^T, [u_3\ -s(n)*u_3]^T, [u_4\ s(n)*u_4]^T, [u_4\ -s(n)*u_4]^T$$
or
$$[u_5\ s(n)*u_5]^T, [u_5\ -s(n)*u_5]^T, [u_6\ s(n)*u_6]^T, [u_6\ -s(n)*u_6]^T$$
$$[u_7\ s(n)*u_7]^T, [u_7\ -s(n)*u_7]^T, [u_8\ s(n)*u_8]^T, [u_8\ -s(n)*u_8]^T$$

wherein, in the eight 8-dimensional vectors, the value of n is same in the 8-dimensional vectors with the same $u_i$, and the value of n is same or different in the 8-dimensional vectors with the different $u_i$.

5. The method of claim 2, wherein, the 8-dimensional vectors selected from the 8-dimensional vector set are the following sixteen 8-dimensional vectors:

$$[u_1\ s(1)*u_1]^T\ [u_1\ -s(1)*u_1]^T\ [u_1\ s(2)*u_1]^T\ [u_1\ -s(2)*u_1]^T$$
$$[u_2\ s(1)*u_2]^T\ [u_2\ -s(1)*u_2]^T\ [u_2\ s(2)*u_2]^T\ [u_2\ -s(2)*u_2]^T$$
$$[u_3\ s(1)*u_3]^T\ [u_3\ -s(1)*u_3]^T\ [u_3\ s(2)*u_3]^T\ [u_3\ -s(2)*u_3]^T$$
$$[u_4\ s(1)*u_4]^T\ [u_4\ -s(1)*u_4]^T\ [u_4\ s(2)*u_4]^T\ [u_4\ -s(2)*u_4]^T$$

or $$[u_1\ s(3)*u_1]^T\ [u_1\ -s(3)*u_1]^T\ [u_1\ s(4)*u_1]^T\ [u_1\ -s(4)*u_1]^T$$
$$[u_2\ s(3)*u_2]^T\ [u_2\ -s(3)*u_2]^T\ [u_2\ s(4)*u_2]^T\ [u_2\ -s(4)*u_2]^T$$
$$[u_3\ s(3)*u_3]^T\ [u_3\ -s(3)*u_3]^T\ [u_3\ s(4)*u_3]^T\ [u_3\ -s(4)*u_3]^T$$
$$[u_4\ s(3)*u_4]^T\ [u_4\ -s(3)*u_4]^T\ [u_4\ s(4)*u_4]^T\ [u_4\ -s(4)*u_4]^T$$

or $$[u_5\ s(1)*u_5]^T\ [u_5\ -s(1)*u_5]^T\ [u_5\ s(2)*u_5]^T\ [u_5\ -s(2)*u_5]^T$$
$$[u_6\ s(1)*u_6]^T\ [u_6\ -s(1)*u_6]^T\ [u_6\ s(2)*u_6]^T\ [u_6\ -s(2)*u_6]^T$$
$$[u_7\ s(1)*u_7]^T\ [u_7\ -s(1)*u_7]^T\ [u_7\ s(2)*u_7]^T\ [u_7\ -s(2)*u_7]^T$$
$$[u_8\ s(1)*u_8]^T\ [u_8\ -s(1)*u_8]^T\ [u_8\ s(2)*u_8]^T\ [u_8\ -s(2)*u_8]^T$$

or $$[u_5\ s(3)*u_5]^T\ [u_5\ -s(3)*u_5]^T\ [u_5\ s(4)*u_5]^T\ [u_5\ -s(4)*u_5]^T$$
$$[u_6\ s(3)*u_6]^T\ [u_6\ -s(3)*u_6]^T\ [u_6\ s(4)*u_6]^T\ [u_6\ -s(4)*u_6]^T$$
$$[u_7\ s(3)*u_7]^T\ [u_7\ -s(3)*u_7]^T\ [u_7\ s(4)*u_7]^T\ [u_7\ -s(4)*u_7]^T$$
$$[u_8\ s(3)*u_8]^T\ [u_8\ -s(3)*u_8]^T\ [u_8\ s(4)*u_8]^T\ [u_8\ -s(4)*u_8]^T$$

or $$[u_1 \ s(1)*u_1]^T \ [u_1 \ -s(1)*u_1]^T \ [u_5 \ s(1)*u_5]^T \ [u_5 \ -s(1)*u_5]^T$$
$$[u_2 \ s(1)*u_2]^T \ [u_2 \ -s(1)*u_2]^T \ [u_6 \ s(1)*u_6]^T \ [u_6 \ -s(1)*u_6]^T$$
$$[u_3 \ s(1)*u_3]^T \ [u_3 \ -s(1)*u_3]^T \ [u_7 \ s(1)*u_7]^T \ [u_7 \ -s(1)*u_7]^T$$
$$[u_4 \ s(1)*u_4]^T \ [u_4 \ -s(1)*u_4]^T \ [u_8 \ s(1)*u_8]^T \ [u_8 \ -s(1)*u_8]^T$$

or $$[u_1 \ s(2)*u_1]^T \ [u_1 \ -s(2)*u_1]^T \ [u_5 \ s(2)*u_5]^T \ [u_5 \ -s(2)*u_5]^T$$
$$[u_2 \ s(2)*u_2]^T \ [u_2 \ -s(2)*u_2]^T \ [u_6 \ s(2)*u_6]^T \ [u_6 \ -s(2)*u_6]^T$$
$$[u_3 \ s(2)*u_3]^T \ [u_3 \ -s(2)*u_3]^T \ [u_7 \ s(2)*u_7]^T \ [u_7 \ -s(2)*u_7]^T$$
$$[u_4 \ s(2)*u_4]^T \ [u_4 \ -s(2)*u_4]^T \ [u_8 \ s(2)*u_8]^T \ [u_8 \ -s(2)*u_8]^T$$

or $$[u_1 \ s(1)*u_1]^T \ [u_1 \ -s(1)*u_1]^T \ [u_5 \ s(1)*u_5]^T \ [u_5 \ -s(1)*u_5]^T$$
$$[u_2 \ s(3)*u_2]^T \ [u_2 \ -s(3)*u_2]^T \ [u_6 \ s(3)*u_6]^T \ [u_6 \ -s(3)*u_6]^T$$
$$[u_3 \ s(2)*u_3]^T \ [u_3 \ -s(2)*u_3]^T \ [u_7 \ s(2)*u_7]^T \ [u_7 \ -s(2)*u_7]^T$$
$$[u_4 \ s(4)*u_4]^T \ [u_4 \ -s(4)*u_4]^T \ [u_8 \ s(4)*u_8]^T \ [u_8 \ -s(4)*u_8]^T.$$

6. The method of claim 2, wherein, the 8-dimensional vectors selected from the 8-dimensional vector set are the following thirty-two 8-dimensional vectors:

$$[u_1 \ s(1)*u_1]^T \ [u_1 \ -s(1)*u_1]^T \ [u_5 \ s(1)*u_5]^T \ [u_5 \ -s(1)*u_5]^T$$
$$[u_2 \ s(1)*u_2]^T \ [u_2 \ -s(1)*u_2]^T \ [u_6 \ s(1)*u_6]^T \ [u_6 \ -s(1)*u_6]^T$$
$$[u_3 \ s(1)*u_3]^T \ [u_3 \ -s(1)*u_3]^T \ [u_7 \ s(1)*u_7]^T \ [u_7 \ -s(1)*u_7]^T$$
$$[u_4 \ s(1)*u_4]^T \ [u_4 \ -s(1)*u_4]^T \ [u_8 \ s(1)*u_8]^T \ [u_8 \ -s(1)*u_8]^T$$
$$[u_1 \ s(2)*u_1]^T \ [u_1 \ -s(2)*u_1]^T \ [u_5 \ s(2)*u_5]^T \ [u_5 \ -s(2)*u_5]^T$$
$$[u_2 \ s(2)*u_2]^T \ [u_2 \ -s(2)*u_2]^T \ [u_6 \ s(2)*u_6]^T \ [u_6 \ -s(2)*u_6]^T$$
$$[u_3 \ s(2)*u_3]^T \ [u_3 \ -s(2)*u_3]^T \ [u_7 \ s(2)*u_7]^T \ [u_7 \ -s(2)*u_7]^T$$
$$[u_4 \ s(2)*u_4]^T \ [u_4 \ -s(2)*u_4]^T \ [u_8 \ s(2)*u_8]^T \ [u_8 \ -s(2)*u_8]^T$$

or $$[u_1 \ s(3)*u_1]^T \ [u_1 \ -s(3)*u_1]^T \ [u_5 \ s(3)*u_5]^T \ [u_5 \ -s(3)*u_5]^T$$
$$[u_2 \ s(3)*u_2]^T \ [u_2 \ -s(3)*u_2]^T \ [u_6 \ s(3)*u_6]^T \ [u_6 \ -s(3)*u_6]^T$$
$$[u_3 \ s(3)*u_3]^T \ [u_3 \ -s(3)*u_3]^T \ [u_7 \ s(3)*u_7]^T \ [u_7 \ -s(3)*u_7]^T$$
$$[u_4 \ s(3)*u_4]^T \ [u_4 \ -s(3)*u_4]^T \ [u_8 \ s(3)*u_8]^T \ [u_8 \ -s(3)*u_8]^T$$
$$[u_1 \ s(4)*u_1]^T \ [u_1 \ -s(4)*u_1]^T \ [u_5 \ s(4)*u_5]^T \ [u_5 \ -s(4)*u_5]^T$$
$$[u_2 \ s(4)*u_2]^T \ [u_2 \ -s(4)*u_2]^T \ [u_6 \ s(4)*u_6]^T \ [u_6 \ -s(4)*u_6]^T$$
$$[u_3 \ s(4)*u_3]^T \ [u_3 \ -s(4)*u_3]^T \ [u_7 \ s(4)*u_7]^T \ [u_7 \ -s(4)*u_7]^T$$
$$[u_4 \ s(4)*u_4]^T \ [u_4 \ -s(4)*u_4]^T \ [u_8 \ s(4)*u_8]^T \ [u_8 \ -s(4)*u_8]^T.$$

7. The method of claim 2, wherein,
in the pre-coding codebook, each codeword vector used to match the relevant channel, or the 8-dimensional vector of the first column of each codeword matrix used to match the relevant channel is obtained based on the 8-dimensional vectors selected from the 8-dimensional vector set.

8. The method of claim 2, wherein:
the information of the pre-coding codebook stored together in the transmitting end and the receiving end is data of part or all of the 4-dimensional vectors, which are used to calculate the selected 8-dimensional vectors, in $u_1, u_2, u_3, u_4, u_5, u_6, u_7, u_8$, s, m, n, and an algorithm for calculating the codeword in the pre-coding codebook according to these 4-dimensional vectors.

9. The method of claim 1, wherein, the 8-dimensional vectors selected from the 8-dimensional vector set are the following eight 8-dimensional vectors:

$$[u_1 \ s(n)*u_1]^T, [u_1 \ -s(n)*u_1]^T, [u_2 \ s(n)*u_2]^T, [u_2 \ -s(n)*u_2]^T$$
$$[u_3 \ s(n)*u_3]^T, [u_3 \ -s(n)*u_3]^T, [u_4 \ s(n)*u_4]^T, [u_4 \ -s(n)*u_4]^T$$

-continued $$[u_5\ s(n)*u_5]^T, [u_5\ -s(n)*u_5]^T, [u_6\ s(n)*u_6]^T, [u_6\ -s(n)*u_6]^T$$
$$[u_7\ s(n)*u_7]^T, [u_7\ -s(n)*u_7]^T, [u_8\ s(n)*u_8]^T, [u_8\ -s(n)*u_8]^T$$

wherein, in the eight 8-dimensional vectors, the value of n is same in the 8-dimensional vectors with the same $u_i$, and the value of n is same or different in the 8-dimensional vectors with the different $u_i$.

10. The method of claim 1, wherein, the 8-dimensional vectors selected from the 8-dimensional vector set are the following sixteen 8-dimensional vectors:

$$[u_1\ \ s(1)*u_1]^T\ [u_1\ \ -s(1)*u_1]^T\ [u_1\ \ s(2)*u_1]^T\ [u_1\ \ -s(2)*u_1]^T$$
$$[u_2\ \ s(1)*u_2]^T\ [u_2\ \ -s(1)*u_2]^T\ [u_2\ \ s(2)*u_2]^T\ [u_2\ \ -s(2)*u_2]^T$$
$$[u_3\ \ s(1)*u_3]^T\ [u_3\ \ -s(1)*u_3]^T\ [u_3\ \ s(2)*u_3]^T\ [u_3\ \ -s(2)*u_3]^T$$
$$[u_4\ \ s(1)*u_4]^T\ [u_4\ \ -s(1)*u_4]^T\ [u_4\ \ s(2)*u_4]^T\ [u_4\ \ -s(2)*u_4]^T$$

or $$[u_1\ \ s(3)*u_1]^T\ [u_1\ \ -s(3)*u_1]^T\ [u_1\ \ s(4)*u_1]^T\ [u_1\ \ -s(4)*u_1]^T$$
$$[u_2\ \ s(3)*u_2]^T\ [u_2\ \ -s(3)*u_2]^T\ [u_2\ \ s(4)*u_2]^T\ [u_2\ \ -s(4)*u_2]^T$$
$$[u_3\ \ s(3)*u_3]^T\ [u_3\ \ -s(3)*u_3]^T\ [u_3\ \ s(4)*u_3]^T\ [u_3\ \ -s(4)*u_3]^T$$
$$[u_4\ \ s(3)*u_4]^T\ [u_4\ \ -s(3)*u_4]^T\ [u_4\ \ s(4)*u_4]^T\ [u_4\ \ -s(4)*u_4]^T$$

or $$[u_5\ \ s(1)*u_5]^T\ [u_5\ \ -s(1)*u_5]^T\ [u_5\ \ s(2)*u_5]^T\ [u_5\ \ -s(2)*u_5]^T$$
$$[u_6\ \ s(1)*u_6]^T\ [u_6\ \ -s(1)*u_6]^T\ [u_6\ \ s(2)*u_6]^T\ [u_6\ \ -s(2)*u_6]^T$$
$$[u_7\ \ s(1)*u_7]^T\ [u_7\ \ -s(1)*u_7]^T\ [u_7\ \ s(2)*u_7]^T\ [u_7\ \ -s(2)*u_7]^T$$
$$[u_8\ \ s(1)*u_8]^T\ [u_8\ \ -s(1)*u_8]^T\ [u_8\ \ s(2)*u_8]^T\ [u_8\ \ -s(2)*u_8]^T$$

or $$[u_5\ \ s(3)*u_5]^T\ [u_5\ \ -s(3)*u_5]^T\ [u_5\ \ s(4)*u_5]^T\ [u_5\ \ -s(4)*u_5]^T$$
$$[u_6\ \ s(3)*u_6]^T\ [u_6\ \ -s(3)*u_6]^T\ [u_6\ \ s(4)*u_6]^T\ [u_6\ \ -s(4)*u_6]^T$$
$$[u_7\ \ s(3)*u_7]^T\ [u_7\ \ -s(3)*u_7]^T\ [u_7\ \ s(4)*u_7]^T\ [u_7\ \ -s(4)*u_7]^T$$
$$[u_8\ \ s(3)*u_8]^T\ [u_8\ \ -s(3)*u_8]^T\ [u_8\ \ s(4)*u_8]^T\ [u_8\ \ -s(4)*u_8]^T$$

or $$[u_1\ \ s(1)*u_1]^T\ [u_1\ \ -s(1)*u_1]^T\ [u_5\ \ s(1)*u_5]^T\ [u_5\ \ -s(1)*u_5]^T$$
$$[u_2\ \ s(1)*u_2]^T\ [u_2\ \ -s(1)*u_2]^T\ [u_6\ \ s(1)*u_6]^T\ [u_6\ \ -s(1)*u_6]^T$$
$$[u_3\ \ s(1)*u_3]^T\ [u_3\ \ -s(1)*u_3]^T\ [u_7\ \ s(1)*u_7]^T\ [u_7\ \ -s(1)*u_7]^T$$
$$[u_4\ \ s(1)*u_4]^T\ [u_4\ \ -s(1)*u_4]^T\ [u_8\ \ s(1)*u_8]^T\ [u_8\ \ -s(1)*u_8]^T$$

or $$[u_1\ \ s(2)*u_1]^T\ [u_1\ \ -s(2)*u_1]^T\ [u_5\ \ s(2)*u_5]^T\ [u_5\ \ -s(2)*u_5]^T$$
$$[u_2\ \ s(2)*u_2]^T\ [u_2\ \ -s(2)*u_2]^T\ [u_6\ \ s(2)*u_6]^T\ [u_6\ \ -s(2)*u_6]^T$$
$$[u_3\ \ s(2)*u_3]^T\ [u_3\ \ -s(2)*u_3]^T\ [u_7\ \ s(2)*u_7]^T\ [u_7\ \ -s(2)*u_7]^T$$
$$[u_4\ \ s(2)*u_4]^T\ [u_4\ \ -s(2)*u_4]^T\ [u_8\ \ s(2)*u_8]^T\ [u_8\ \ -s(2)*u_8]^T$$

or $$[u_1\ \ s(1)*u_1]^T\ [u_1\ \ -s(1)*u_1]^T\ [u_5\ \ s(1)*u_5]^T\ [u_5\ \ -s(1)*u_5]^T$$
$$[u_2\ \ s(3)*u_2]^T\ [u_2\ \ -s(3)*u_2]^T\ [u_6\ \ s(3)*u_6]^T\ [u_6\ \ -s(3)*u_6]^T$$
$$[u_3\ \ s(2)*u_3]^T\ [u_3\ \ -s(2)*u_3]^T\ [u_7\ \ s(2)*u_7]^T\ [u_7\ \ -s(2)*u_7]^T$$
$$[u_4\ \ s(4)*u_4]^T\ [u_4\ \ -s(4)*u_4]^T\ [u_8\ \ s(4)*u_8]^T\ [u_8\ \ -s(4)*u_8]^T.$$

11. The method of claim 1, wherein, the 8-dimensional vectors selected from the 8-dimensional vector set are the following thirty-two 8-dimensional vectors:

$$[u_1 \ s(1)*u_1]^T \ [u_1 \ -s(1)*u_1]^T \ [u_5 \ s(1)*u_5]^T \ [u_5 \ -s(1)*u_5]^T$$
$$[u_2 \ s(1)*u_2]^T \ [u_2 \ -s(1)*u_2]^T \ [u_6 \ s(1)*u_6]^T \ [u_6 \ -s(1)*u_6]^T$$
$$[u_3 \ s(1)*u_3]^T \ [u_3 \ -s(1)*u_3]^T \ [u_7 \ s(1)*u_7]^T \ [u_7 \ -s(1)*u_7]^T$$
$$[u_4 \ s(1)*u_4]^T \ [u_4 \ -s(1)*u_4]^T \ [u_8 \ s(1)*u_8]^T \ [u_8 \ -s(1)*u_8]^T$$
$$[u_1 \ s(2)*u_1]^T \ [u_1 \ -s(2)*u_1]^T \ [u_5 \ s(2)*u_5]^T \ [u_5 \ -s(2)*u_5]^T$$
$$[u_2 \ s(2)*u_2]^T \ [u_2 \ -s(2)*u_2]^T \ [u_6 \ s(2)*u_6]^T \ [u_6 \ -s(2)*u_6]^T$$
$$[u_3 \ s(2)*u_3]^T \ [u_3 \ -s(2)*u_3]^T \ [u_7 \ s(2)*u_7]^T \ [u_7 \ -s(2)*u_7]^T$$
$$[u_4 \ s(2)*u_4]^T \ [u_4 \ -s(2)*u_4]^T \ [u_8 \ s(2)*u_8]^T \ [u_8 \ -s(2)*u_8]^T$$

or $$[u_1 \ s(3)*u_1]^T \ [u_1 \ -s(3)*u_1]^T \ [u_5 \ s(3)*u_5]^T \ [u_5 \ -s(3)*u_5]^T$$
$$[u_2 \ s(3)*u_2]^T \ [u_2 \ -s(3)*u_2]^T \ [u_6 \ s(3)*u_6]^T \ [u_6 \ -s(3)*u_6]^T$$
$$[u_3 \ s(3)*u_3]^T \ [u_3 \ -s(3)*u_3]^T \ [u_7 \ s(3)*u_7]^T \ [u_7 \ -s(3)*u_7]^T$$
$$[u_4 \ s(3)*u_4]^T \ [u_4 \ -s(3)*u_4]^T \ [u_8 \ s(3)*u_8]^T \ [u_8 \ -s(3)*u_8]^T$$
$$[u_1 \ s(4)*u_1]^T \ [u_1 \ -s(4)*u_1]^T \ [u_5 \ s(4)*u_5]^T \ [u_5 \ -s(4)*u_5]^T$$
$$[u_2 \ s(4)*u_2]^T \ [u_2 \ -s(4)*u_2]^T \ [u_6 \ s(4)*u_6]^T \ [u_6 \ -s(4)*u_6]^T$$
$$[u_3 \ s(4)*u_3]^T \ [u_3 \ -s(4)*u_3]^T \ [u_7 \ s(4)*u_7]^T \ [u_7 \ -s(4)*u_7]^T$$
$$[u_4 \ s(4)*u_4]^T \ [u_4 \ -s(4)*u_4]^T \ [u_8 \ s(4)*u_8]^T \ [u_8 \ -s(4)*u_8]^T.$$

12. The method of claim 1, wherein,
in the pre-coding codebook, each codeword vector used to match the relevant channel, or the 8-dimensional vector of the first column of each codeword matrix used to match the relevant channel is obtained based on the 8-dimensional vectors selected from the 8-dimensional vector set.

13. The method of claim 1, wherein:
when obtaining the codeword vectors or the first column of the codeword matrixes of the pre-coding codebook based on the 8-dimensional vectors selected from the 8-dimensional vector set, the selected 8-dimensional vectors are taken directly as the codeword vectors or the first column of the codeword matrixes of the pre-coding codebook; or
when obtaining the codeword vectors or the first column of codeword matrixes of the pre-coding codebook based on the 8-dimensional vectors selected from the 8-dimensional vector set, the 8-dimensional vectors, acquired by multiplying all of the selected 8-dimensional vectors with a constant and/or row exchanging all of the selected 8-dimension vectors in the same way, is taken as the codeword vectors or the first column of the codeword matrixes of the pre-coding codebook.

14. The method of claim 13, further comprising:
when the transmitting end uses single-polarized antenna, and regardless of whether performing row exchange, the transmitting end maps each row in the codeword with each antenna, mapping the rows at which the $1^{st}$, $5^{th}$, $2^{nd}$, $6^{th}$, $3^{rd}$, $7^{th}$, $4^{th}$, and $8^{th}$ elements of the selected 8-dimensional vector in the codeword are located in turn to each antenna arranged in turn from the outermost antenna; or
when the transmitting end uses dual-polarized antenna, and regardless of whether performing row exchange, the transmitting end maps each row in the codeword with each antenna, mapping the rows at which the $1^{st}$ to $4^{th}$ elements of the selected 8-dimensional vector in the codeword are located in turn to the 4 antennas arranged in turn from the outermost antenna in the first polarization direction, and mapping the rows at which the $5^{th}$ to $8^{th}$ elements of the selected 8-dimensional vector in the codeword are located in turn to the 4 antennas arranged in turn from the outermost antenna in the second polarization direction, and the outmost antennas in the two polarization directions are adjacent.

15. The method of claim 1, wherein:
the information of the pre-coding codebook stored together in the transmitting end and the receiving end is data of part or all of the 4-dimensional vectors, which are used to calculate the selected 8-dimensional vectors, in $u_1$, $u_2$, $u_3$, $u_4$, $u_5$, $u_6$, $u_7$, $u_8$, s, m, n, and an algorithm for calculating the codeword in the pre-coding codebook according to these 4-dimensional vectors.

16. The method of claim 1, wherein:
the pre-coding codebook is divided into a plurality of codebooks to be stored in the transmitting end and the receiving end, and index information corresponding to the codewords in the plurality of codebooks is fed back during feedback, wherein, the content indicated by the index information corresponding to the codewords in the plurality of codebooks constructs the pre-coding codebook via a function which is agreed by the transmitting end and the receiving end.

17. A Multiple-Input Multiple-Output (MIMO) system with eight antennas, comprising a transmitting end and a receiving end, wherein,
the transmitting end is configured to: store information of a pre-coding codebook which comprises a codeword, find out the codeword according to the serial number of the codeword fed back by the receiving end, and pre-code, by using the codeword, a symbol block sent to the receiving end;

the receiving end is configured to: store the pre-coding codebook, select a codeword from the pre-coding codebook according to an estimated channel matrix, and feed back the serial number of the codeword to the transmitting end;

wherein, at least eight codeword vectors or column vectors in at least eight codeword matrixes in the pre-coding codebook are obtained based on 8-dimensional vectors selected from the following 8-dimensional vector set:

$$[u_1\ s(n) * u_1]^T, [u_1\ -s(n) * u_1]^T, [u_2\ s(n) * u_2]^T, [u_2\ -s(n) * u_2]^T$$
$$[u_3\ s(n) * u_3]^T, [u_3\ -s(n) * u_3]^T, [u_4\ s(n) * u_4]^T, [u_4\ -s(n) * u_4]^T$$
$$[u_5\ s(n) * u_5]^T, [u_5\ -s(n) * u_5]^T, [u_6\ s(n) * u_6]^T, [u_6\ -s(n) * u_6]^T$$
$$[u_7\ s(n) * u_7]^T, [u_7\ -s(n) * u_7]^T, [u_8\ s(n) * u_8]^T, [u_8\ -s(n) * u_8]^T$$

wherein,
$u_1=[1\ 1\ 1\ 1]^T$, $u_2=[1\ j\ -1\ -j]^T$, $u_3=[1\ -1\ 1\ -1]^T$, $u_4=[1\ -j\ -1\ j]^T$
$u_5=[1\ q0\ j\ q1]^T$, $u_6=[1\ q1\ -j\ -q0]^T$, $u_7=[1\ q2\ j\ q3]^T$, $u_8=[1\ q3\ -j\ q2]^T$
$q0=(1+j)/\sqrt{2}$; $q1=(-1+j)/\sqrt{2}$; $q2=(-1-j)/\sqrt{2}$; $q3=(1-j)/\sqrt{2}$;
$s(n)$ is an element in vector s, $n=1, 2, 3, 4$, and $s=[s(1)\ s(2)\ s(3)\ s(4)]=[1\ j\ q0\ q1]$.

18. The method of claim 17, wherein,
the rank of the channel matrix is equal to 1, and the codeword of the pre-coding codebook is the 8-dimensional codeword vector, wherein at least part of the codeword vectors are obtained based on the 8-dimensional vectors selected from the 8-dimensional vector set; or
the rank of the channel matrix is equal to 2, the codeword of the pre-coding codebook is two-column codeword matrix, and in the pre-coding codebook, the first column 8-dimensional vectors of at least part of the codeword matrixes are obtained based on the 8-dimensional vectors selected from the 8-dimensional vector set; and the second column 8-dimensional vectors of at least part of the codeword matrixes are obtained based on the 8-dimensional vectors selected from a set consisting of $[mu_i\ nu_i]^T$, where $i=1\sim8$, m, $n\in\{1,-1,\ j,-j,\ q1,\ q2,\ q3,\ q0\}$; and the first column and the second column of each codeword matrix are orthogonal.

19. A method for constructing a codeword in a pre-coding codebook, applied to a Multiple-Input Multiple-Output (MIMO) system with eight antennas, and comprising:
defining eight 4-dimensional vectors $u_1 \sim u_8$ and one 4-dimensional vectors, wherein:
$u_1=[1\ 1\ 1\ 1]^T$, $u_2=[1\ j\ -1\ -j]^T$, $u_3=[1\ -1\ 1\ -1]^T$, $u_4=[1\ -j\ -1\ j]^T$
$u_5=[1\ q0\ j\ q1]^T$, $u_6=[1\ q1\ -j\ -q0]^T$, $u_7=[1\ q2\ j\ q3]^T$, $u_8=[1\ q3\ -j\ q2]^T$
$s=[s(1)\ s(2)\ s(3)\ s(4)]=[1\ j\ q0\ q1]$;
wherein: $q0=(1+j)/\sqrt{2}$; $q1=(-1+j)/\sqrt{2}$; $q2=(-1-j)/\sqrt{2}$; $q3=(1-j)/\sqrt{2}$
constructing one 8-dimensional vector set comprising a plurality of 8-dimensional vectors, $n=1, 2, 3$ or $4$; and the 8-dimensional vector set is:

$$[u_1\ s(n) * u_1]^T, [u_1\ -s(n) * u_1]^T, [u_2\ s(n) * u_2]^T, [u_2\ -s(n) * u_2]^T$$
$$[u_3\ s(n) * u_3]^T, [u_3\ -s(n) * u_3]^T, [u_4\ s(n) * u_4]^T, [u_4\ -s(n) * u_4]^T$$
$$[u_5\ s(n) * u_5]^T, [u_5\ -s(n) * u_5]^T, [u_6\ s(n) * u_6]^T, [u_6\ -s(n) * u_6]^T$$
$$[u_7\ s(n) * u_7]^T, [u_7\ -s(n) * u_7]^T, [u_8\ s(n) * u_8]^T, [u_8\ -s(n) * u_8]^T$$

and
according to a rank of a channel matrix, constructing the codeword in the pre-coding codebook by using one of the following methods:
when the rank of the channel matrix is equal to 1, selecting a plurality of 8-dimensional vectors from the 8-dimensional vector set, and obtaining the codeword vector for matching the relevant channel in the pre-coding codebook based on the selected 8-dimensional vectors,
when the rank is equal to 2, the codeword for matching the relevant channel in the pre-coding codebook being two-column codeword matrix, and obtaining the first column 8-dimensional vectors of the codeword matrix based on the 8-dimensional vectors selected from the 8-dimensional vector set, and obtaining the second column 8-dimensional vectors of the codeword matrix based on the 8-dimensional vectors selected from the set consisting of $[mu_i\ nu_i]^T$, wherein, $i=1\sim8$, m, $n\in\{1,-1,\ j,-j,\ q1,\ q2,\ q3,\ q0\}$, and the first column and the second column of each codeword matrix are orthogonal.

* * * * *